United States Patent
Riley et al.

(10) Patent No.: US 11,949,583 B2
(45) Date of Patent: Apr. 2, 2024

(54) ENFORCING REFERENCE OPERATING STATE COMPLIANCE FOR CLOUD COMPUTING-BASED COMPUTE APPLIANCES

(71) Applicant: HEWLETT PACKARD ENTERPRISE DEVELOPMENT LP, Houston, TX (US)

(72) Inventors: Dwight D. Riley, Houston, TX (US); Robert W. Noller, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/661,074

(22) Filed: Apr. 28, 2022

(65) Prior Publication Data
US 2023/0353477 A1    Nov. 2, 2023

(51) Int. Cl.
*H04L 45/02* (2022.01)
*G06F 9/455* (2018.01)
(Continued)

(52) U.S. Cl.
CPC .......... *H04L 45/02* (2013.01); *G06F 9/45558* (2013.01); *H04L 45/76* (2022.05); *H04L 67/10* (2013.01); *G06F 2009/45595* (2013.01)

(58) Field of Classification Search
None
See application file for complete search history.

(56) References Cited

U.S. PATENT DOCUMENTS 10,425,282 B2 * 9/2019 Jacquin .............. H04L 41/0895
10,579,800 B2   3/2020 Blundell
(Continued)

FOREIGN PATENT DOCUMENTS

WO   WO2019072823   4/2019
WO   WO2020205514   10/2020
(Continued)

OTHER PUBLICATIONS

Berger et al. "Scalable Attestation: A Step Toward Secure and Trusted Clouds", 2015 IEEE Int'l Conf'n on Cloud Engineering, Mar. 9, 2015 [retrieved on Mar. 15, 2023]. DOI No. 10.1109/IC2E.2015.32. (Year: 2015).*

*Primary Examiner* — Kevin T Bates
*Assistant Examiner* — Dae Kim
(74) *Attorney, Agent, or Firm* — Trop, Pruner & Hu, P.C.

(57) ABSTRACT

A process includes enforcing compliance of a compute appliance to a reference operating state for the compute appliance. The compute appliance is part of a cloud-based computing system. Enforcing compliance with the reference operating state includes, responsive to a startup of the compute appliance, the compute appliance determining an actual compute state of the compute appliance. The actual compute state includes an actual physical topology placement of a hardware component of the compute appliance. Determining the actual compute state includes determining the physical topology placement of the hardware component. Enforcing compliance with the reference operating state includes verifying whether the actual compute state complies with the reference compute state. The verification includes comparing the actual compute state to the reference compute state. Enforcing compliance with the reference operating state includes, responsive to a result of the verification, controlling whether the compute appliance is part of the cloud-based computing system.

19 Claims, 12 Drawing Sheets

(51) Int. Cl.
  *H04L 45/76* (2022.01)
  *H04L 67/10* (2022.01)

(56) References Cited

U.S. PATENT DOCUMENTS

| | | | |
|---|---|---|---|
| 10,896,266 B1* | 1/2021 | BeSerra | H04L 63/062 |
| 2009/0204964 A1 | 8/2009 | Foley et al. | |
| 2013/0191643 A1* | 7/2013 | Song | H04L 9/3265 |
| | | | 713/176 |
| 2015/0163229 A1* | 6/2015 | Lindteigen | H04L 9/0618 |
| | | | 713/155 |
| 2015/0220927 A1* | 8/2015 | Smith | G06Q 40/08 |
| | | | 705/44 |
| 2016/0065589 A1* | 3/2016 | Leighton | H04L 63/123 |
| | | | 726/4 |
| 2016/0094573 A1* | 3/2016 | Sood | G06F 21/554 |
| | | | 726/1 |
| 2016/0366185 A1* | 12/2016 | Lee | G06F 9/45558 |
| 2018/0234255 A1* | 8/2018 | Fu | H04L 9/30 |
| 2019/0005224 A1 | 1/2019 | Oliver et al. | |
| 2020/0186568 A1 | 6/2020 | Erb et al. | |
| 2021/0021609 A1 | 1/2021 | Smith et al. | |
| 2021/0160100 A1* | 5/2021 | Steinmacher-Burow | |
| | | | H04L 12/4641 |
| 2021/0279193 A1* | 9/2021 | Leyendecker | G06F 13/4282 |
| 2022/0417035 A1* | 12/2022 | Guilford | H04L 63/10 |

FOREIGN PATENT DOCUMENTS

| | | |
|---|---|---|
| WO | WO2020231952 | 11/2020 |
| WO | WO20210006973 | 1/2021 |
| WO | WO2021067510 | 4/2021 |

\* cited by examiner

ENFORCING REFERENCE OPERATING STATE COMPLIANCE FOR CLOUD COMPUTING-BASED COMPUTE APPLIANCES

BACKGROUND

A cloud architecture may include a computer system domain of multiple physical server nodes (e.g., blade servers or rack mounted servers), or "compute appliances." The compute appliances define a physical infrastructure domain. The physical infrastructure domain may be managed by a central management system, which orchestrates a software-defined logical infrastructure and services (e.g. software-defined compute (SDC) services, software-defined storage (SDS) services and software-defined networking (SDN) services), which are hosted on the compute appliances. The software-defined logical infrastructure relies on an abstraction infrastructure layer (e.g., a hypervisor for virtual machine (VM) abstractions or an OS for container abstractions) to provide the central management system control of the services.

DETAILED DESCRIPTION

Figure 1:
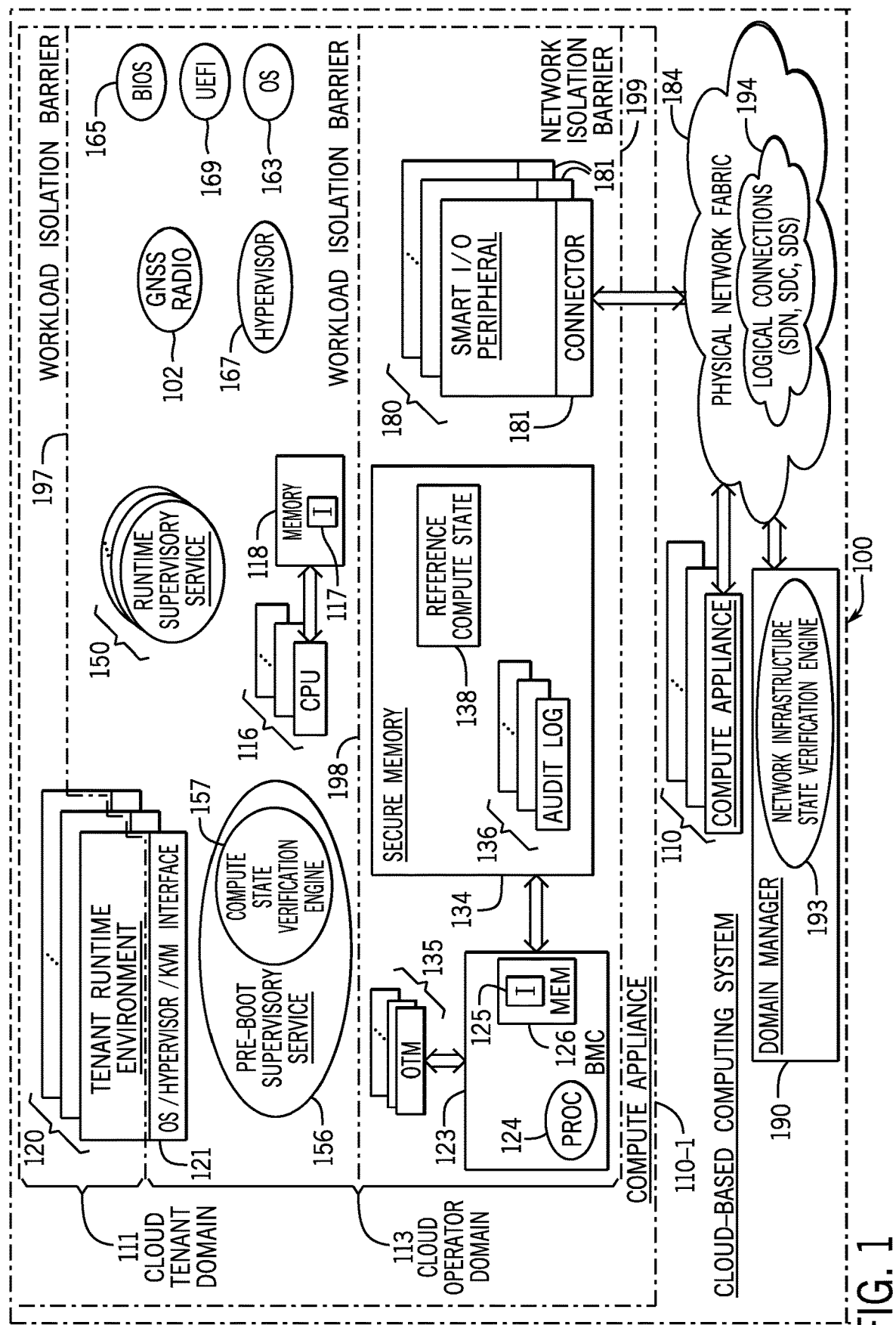
FIG. 1 is a block diagram of a compute appliance that enforces compliance of the compute appliance with a reference compute state according to an example implementation.

A computer platform, such as a server (e.g., a blade server or a rack-mounted server), may have an architecture (e.g., a traditional personal computer (PC)-based architecture, or "legacy architecture") that may be characterized as employing a "host-centric" control model. In the host-centric control model, the server controls are rooted in the host of the server. As used herein, a "host" refers to the part of the server containing the main central processing units (CPUs) and the main system memory. Accordingly, the host provides a function or service by one or multiple main CPUs executing machine-readable instructions. Therefore, the server controls being rooted in the host of the server means that the server controls are rooted in the main CPUs of the server.

The server may be a compute node of a cloud-based computing system, or "cloud-based computing system." The software layer of the server's host may provide the logical infrastructure abstraction and control surfaces via a hypervisor software stack (for virtual machines (VMs)) and/or an operating system software stack (for containers). The result of this host-centric control model is a separation of the administrative control of the physical infrastructure of the compute node from the logical infrastructure of the compute node.

A central management system of the cloud computer system may be built around a hierarchical management structure. At the lowest level of the hierarchical management structure, the compute node may be divided into two distinct control surfaces: a first control surface for the physical infrastructure of the compute node and a second control surface for the logical infrastructure of the compute node. Each of these infrastructures may be connected to its own central manager so that there may be two distinctly different associated administrators: an administrator for the physical infrastructure and a virtualization administrator for the logical infrastructure. Correspondingly, there may be two distinct central management software stacks, and there may be a cloud infrastructure manager at the top of the hierarchical management structure to unify the software stacks. The cloud infrastructure manager may replace the roles of the traditional infrastructure administrator with the following distinct cloud roles: the operator (for physical & logical infrastructure control), the tenant (for abstracted instance control), and the infrastructure support technician (for support).

Cloud-native architectures may look similar to traditional cloud architectures, but cloud-native architectures differ in one significant aspect. Cloud-native architectures blend the physical and logical infrastructure by using intelligent input/output (I/O) subsystems, called "smart I/O peripherals" herein, for purposes of offloading services from the host (i.e., offloading traditional processing performed by the host) and by isolating node management controls within the smart I/O peripherals. The blending of physical and logical infrastructure changes the general-purpose nature of legacy architecture servers by utilizing an independent software stack, which may be managed in segments (e.g., segments aligned to SDC, SDS, and SDN layers). Accordingly, such a server is referred to herein as a segmented server (or "segmented compute node"). This segmented control model presents orchestration and control sequencing challenges for the legacy architecture server related to ensuring that all independent managers are in a "ready state" before backend I/O services provided by the smart I/O peripherals are rendered. This new orchestration and sequencing results in a more vertically-integrated (i.e., tightly-coupled or unified) architecture. While the cloud-native architecture uses a hierarchical control management domain structure, the result is a unified experience around three control roles: the operator, the tenant, and the support technician.

As used herein, a "smart I/O peripheral" refers to a device, or component, of the server, which provides one or multiple functions for the host, which, in legacy architectures, have been controlled by the host. In general, a smart I/O peripheral is hardware processor that has been assigned (e.g., programmed with) a certain personality. The smart I/O peripheral may provide one or multiple backend I/O services (or "host offloaded services) in accordance with its personality. The backend I/O services may be non-transparent services or transparent services. An example of a non-transparent host service is a hypervisor virtual switch offloading service using PCIe direct I/O (e.g., CPU input-output memory management unit (IOMMU) mapping of PCIe device physical and/or virtual functions) with no host control. A host transparent backend I/O service does not involve modifying host software. As examples, transparent backend I/O services may include network-related services, such as encryption services, overlay network access services and firewall-based network protection services. In general, the smart I/O peripheral may provide any of a number of transparent and/or non-transparent backend network services for the host. As examples, network-related backend services may include overlay network services, virtual switching services, virtual routing services and network function virtualization services. As examples, storage-related backend services may include backend storage I/O services for the host, such as storage acceleration services (e.g., non-volatile memory express (NVMe)-based services), direct attached storage services, or a Serial Attached SCSI (SAS) storage service.

A smart I/O peripheral may coordinate with another network component for purposes of providing one or multiple backend I/O services. For example, the smart I/O peripheral may be a "smart NIC" that is connected to an Ethernet Top-of-the Rack (ToR) switch. This combination may provide host isolation by using the smart NIC in its "lock state" for Peripheral Component Interconnect express (PCIe) physical and virtual functions. Here, the "lock state" refers to restricting host access from full reconfiguring capability of the device based on the cloud operator's goals. For example, the lock state may prevent the host from reconfiguring certain infrastructure (e.g., turning off storage redundancy, turning off graphics processing units (GPUs), and so forth), which might affect, for example, the cloud operator's contractual obligation to the tenant. With this arrangement, the ToR switch may be used to provide such network services as a network protection service (e.g., a firewall service) or an instance overlay service (e.g., a virtual extensible local area network (VxLAN) service).

The smart I/O peripheral may take on one of many different physical forms and provide any of a wide variety of backend I/O services. A given smart I/O peripheral may provide network connectivity (e.g., an Ethernet port), provide multiple CPU cores, provide hardware acceleration engines, and provide a rich programming environment (i.e., an environment that enhances the integration of independent software components). Moreover, the smart I/O peripheral may provide endpoint connectivity (e.g., provide one or multiple PCIe ports) to an in-band communication channel (e.g., a PCIe link or bus) that is accessible by the host. As a specific example, the components of a PCIe card-based smart I/O peripheral may be mounted on a circuit card substrate that has a PCIe card edge connector that has a form factor to allow the smart I/O peripheral to be installed in a PCIe card slot connector of the server. In accordance with further implementations, a smart I/O peripheral may be constructed to be installed in a card slot connector other than a PCIe card slot connector, and in accordance with yet further example implementations, components of the smart I/O peripheral may be mounted (e.g., surface mounted) to a motherboard of the server.

A cloud-native, segmented server that has smart I/O peripherals results in a dual-management control system within the server, separating the control of the smart I/O device from the host CPU control by adding a hardware-abstracted interface to the host. The hardware-abstracted interface may be presented to the host as a standard local I/O peripheral (i.e., a non-smart I/O peripheral).

The host may access a smart I/O peripheral (e.g., access a PCIe-based smart I/O peripheral using PCIe direct I/O communications) to map physical functions and virtual functions (e.g., PCIe physical and virtual functions) into machine abstractions (e.g., bare metal or virtual machine abstractions). The backend I/O services that are provided by the smart I/O peripheral may be fully managed by the smart I/O peripheral independently from the host. Moreover, the lifecycles of these services may be controlled by the smart I/O peripheral independently from the host.

Therefore, a segmented server that has a cloud-native infrastructure architecture with hardware abstraction-isolated smart I/O peripherals differs from a non-segmented server that has a legacy architecture that is built around a host-centric control. This difference creates an architecture gap in current server designs, for both the pre-boot and runtime environments. The architecture gap presents challenges in orchestrating control, as the host is no longer the root of control.

One approach to address this dilemma and bridge the architecture gap is to modify a legacy server hardware architecture to allow control of the server to be rooted in a service processor of the server. For example, a slot connector (e.g., a PCIe connector) of the legacy server hardware architecture may be modified to support a sideband communication channel with a baseboard management controller, or "BMC." In general, the BMC is a service processor that is constructed to manage the computer platform. With this approach, control is rooted to the BMC, and the traditional role of the BMC is expanded to manage the smart I/O peripheral by communicating management traffic over the sideband communication channel. Another approach to bridge the architecture gap may be to modify the legacy server hardware architecture to include an additional service processor, a platform controller, and root control in the platform controller so that the platform controller supervises both the BMC and the smart I/O peripheral.

The above-described approaches to bridge the architecture gap in a segmented server involve changes to the architectures of next generation servers. Modifying the legacy server hardware architecture to accommodate smart I/O peripherals in next generation servers, however, does not provide a backward compatibility path for existing servers.

In accordance with example implementations that are described herein, a trust domain (called the "cloud tenant domain" herein) of the host of a segmented server, called a "compute appliance," is blended with a hardware isolated trust domain (called the "cloud operator domain" herein) of a smart I/O peripheral of the compute appliance. This blending ensures that services of the host, which may be offloaded to the smart I/O peripheral, are secured and controlled, both prior to the operating environment becoming operational and after the operating environment is operational. Stated differently, the host software stack, in accordance with example implementations, is blended with the offloaded services. This segue of the host-offloaded services with the host software stack may impact the machine abstractions (e.g., bare metal OS environments and hypervisor-VM environments), which are supported by the smart I/O peripheral. In accordance with example implementations, the compute appliance includes host supervisory services to oversee the machine abstractions.

For a bare metal application operating environment (i.e., an environment in which software has full access to the host CPU and other resources of the physical platform, which are exposed to the software), the compute appliance may provide a host supervisory service that links the backend I/O services that are provided by the smart I/O peripheral into a single security trust domain to the host space. Moreover, in accordance with example implementations, the bare metal operating system may provide a hypervisor; and the compute appliance may provide corresponding host supervisory services for the associated machine abstractions. The host supervisory services provide the ability to compensate for the architecture gap that is created by the opaqueness of the smart I/O peripheral's architecture.

A compute appliance may experience security vulnerabilities due to the unauthorized modification of the compute appliance's "compute state." In this context, a "compute state" of a compute appliance generally refers to the configuration of the compute appliance. A compute appliance may be specifically configured to serve a specific purpose. These purposes (and corresponding configurations) may widely vary. In this manner, a given compute appliance may, as examples, be configured to control the lights of a stadium, provide database management services for a business enterprise, manage transactions for financial institutions, and so forth. A specific configuration, or "reference compute state," may be defined for a given compute appliance, depending on the particular intended use, or application, of the compute appliance. The reference compute state may define any of a number of different configuration attributes of the compute appliance, such as a specific inventory of hardware components, physical topology locations (e.g., specific slot number, specific cage numbers, connections with specific connectors or wiring harnesses) for respective specific hardware components. The reference compute state may define specific firmware versions, and the reference compute state may define specific firmware signatures. The reference compute state may specify relationships among certain hardware components (e.g., a certain group of DIMMs are to have a certain equal size or are to have a certain minimum size, or a certain group of storage drives are to be equal in size or meet certain performance criteria). The reference compute state may specify whether a particular component can be hot plugged or hot unplugged. The reference compute state may set forth criteria for hot plugged replacements of storage drives and/or memory modules. A hot pluggable component may be a physical component or a virtual component. For example, a PCIe adapter (e.g., a smart I/O peripheral) may provide independent hot plug virtual and physical functions as part of the adapter's PCIe direct-I/O capability for virtual machines.

As examples of unauthorized changes to a compute appliance's reference compute state, an authorized PCIe card may be installed in the compute appliance, or an otherwise authorized dual inline memory module (DIMM) may be installed in an unauthorized memory slot for the DIMM. As another example of an unauthorized change, a particular DIMM or a Non-Volatile Memory express (NVMe) storage drive may not be authorized for a compute appliance, but the DIMM or NVMe storage drive may nonetheless be hot plugged into the compute appliance. As another example, a particular hot pluggable component (e.g., a NVMe storage device or a DIMM) may be approved to be used in certain hot plug connectors of the compute appliance, but the component may be hot plugged into a particular hot plug connector that is not authorized for the hot pluggable component.

One way to ensure that a particular reference compute state is enforced for a compute appliance is to use an onsite technician to set up the compute appliance. Moreover, the compute appliance may be placed in a secure environment to ensure that unauthorized modifications do not thereafter occur to the compute appliance's compute state. However, these security measures may be rather impractical for a modern cloud-based computing system, which includes a significant number (e.g., thousands, tens of thousands or even more) of compute appliances (e.g., blade servers) that may be located in multiple data centers.

In accordance with example implementations that are described herein, a pre-boot supervisory service of a compute appliance enforces compliance of the compute appliance with a reference compute state for the compute appliance. More specifically, in accordance with example implementations, responsive to a startup (e.g., a power on boot or reset-initiated boot) of the compute appliance, the onboard pre-boot supervisory service verifies that the compute appliance complies with a reference compute state, which has been specified for the compute appliance. If the pre-boot supervisory service verifies compliance, then the pre-boot supervisory service allows the compute appliance to proceed with setting up tenant runtime environments (e.g., machine abstractions), joining the fleet of other compute appliances of a cloud-based computing system, and providing the tenant runtime environments. If, however, the verification by the pre-boot supervisory service fails, then, in accordance with example implementations, the pre-boot supervisory service prevents the compute appliance from setting up or providing any tenant runtime environments, and pre-boot service causes the compute appliance to immediately isolate, or quarantine, itself from the cloud-based computing system.

In accordance with some implementations, the compute appliance includes one or multiple runtime supervisory services that enforce compliance of the compute appliance with the reference compute state in the compute appliance's runtime environment. The runtime supervisory service(s) protect the compute appliance for configuration modifications that may occur, for example, by a hot plug event (in which a component is hot-plugged into a hot plug connector of the compute appliance) or a hot unplug event (in which a component is hot unplugged from a hot plug connector). A runtime supervisory service may, for example, in response to a hot plug event or hot unplug event, determine if the event is allowed by the reference compute state. If the runtime supervisory service determines that the event is not allowed, then, in accordance with example implementations, the runtime supervisory service may cause the compute appliance to take one or multiple appropriate remedial actions. As examples, these remedial actions may include one or multiple of the following: the compute appliance quiescing operations with the cloud-based computing system; the compute appliance powering down; the compute appliance transitioning to the pre-boot environment; the compute appliance, isolating, or quarantining itself from the cloud-based computing system; the compute appliance cryptographically erasing the content of persistent memory devices and storage devices of and associated with the compute appliance; the compute appliance sending alert messages to a domain manager and to a system administrator; and so forth.

Unauthorized modifications to a network infrastructure of a cloud-based computing system may expose the computing system to security vulnerabilities. As examples of unauthorized network infrastructure state modifications, an authorized network switch may be connected to a compute appliance or an otherwise authorized network switch may be relocated to an unauthorized physical location (e.g., a floor of a building different from the floor permitted for the network switch). As another example, a compute appliance may be connected to an authorized network switch, but the compute appliance may be in a different physical location than the one authorized. As another example, the cloud-based computing system may have a scaling policy for scaling up or down compute appliances of the system. For example, the policy may specify that the scaling is to occur in units of ten compute appliances at a time. An attempt (and presumably suspect) attempt may be made to add a single compute appliance to a cloud-based computing system without meeting the requisite scaling criteria.

Security vulnerabilities due to unauthorized compute state or network infrastructure state modifications may cause noncompliance with strict specifications for the compute state or network infrastructure state; introduce security concerns for cloud tenant software; and potentially compromise the integrity of the cloud-based computing system.

In accordance with example implementations that are described herein, the reference compute state includes a set of complex identifications (IDs), which may define, for example, attributes of specific hardware components and the physical topological locations of these hardware components in the compute appliance.

The complex ID, in accordance with example implementations, has two components: an anchor ID and a common ID. The anchor ID, in accordance with example implementations, is a unique identifier for a particular component (e.g., a PCIe card), such as, for example, a media access control (MAC) address of the component, an encrypted MAC address of the component, and so forth. In accordance with some implementations, the anchor ID may define a particular category or class of hardware component, without identifying a unique hardware component. As an example, in accordance with example implementations, the anchor ID may identify a minimize storage size for the hardware component. As another example, the anchor ID may identify a particular manufacturer of the hardware component. As another example, the anchor ID may identify a minimum processor specification for the hardware component. As another example, the anchor ID may identify a model number for the hardware component or a range of model numbers for the hardware component. As another example, the anchor ID may identify a particular attribute of the hardware component. As another example, the anchor may identify a serial number range for the hardware component. In general, the anchor ID may identify any of a number of other attributes indirectly or directly attributable to the hardware component, such as maximum power dissipation for the hardware component, an electromagnetic interference rating range for the hardware component, and so forth.

The common ID, in accordance with example implementations, identifies a particular physical topology placement associated with the hardware component. For example, a physical topology placement associated with a PCIe card may be that the PCIe card should be located in slot 2 of PCIe input/output (I/O) cage B of the compute appliance. Because the complex IDs uniquely identify components and the components' physical topology placements, the complex IDs may be used to attest to a compute state of a compute appliance in actual deployment.

The reference compute state may include data representing configuration criteria for a compute appliance other than data representing the complex IDs of certain hardware components. For example, the reference compute state may specify a policy for the compute appliance for responding to hot plug events and/or hot unplug events. As another example, the reference compute state may specify a policy for failing over to redundant devices, a policy for reporting audit logs, a policy for handling program execution crashes, a minimum firmware version, a specific firmware version, an access control policy for updating firmware, and so forth.

The reference compute state for a given compute appliance may be defined by a digital certificate, which is signed by an administrator that has the appropriate credentials. The certificate may, for example, contain data that represents an identity (e.g., a serial number of the compute appliance, a reference to an endorsement key of a trusted platform module (TPM), and so forth) of the compute appliance, and the certificate may contain data that represents complex IDs and other configuration criteria for the compute appliance. The certificate defining the reference compute state is different from a platform certificate, which may, for example, list an inventory for a server, without specifying how these components are actually physically deployed in the server (e.g., without specifying their respective physical topologies) and without specifying other configuration criteria for the server.

Enforcing a compute appliance to comply with a reference compute state so that the compute appliance does provide cloud tenant runtime services if the compute appliance is not in compliance, as described herein, protects the cloud tenant space (i.e., the rental space of the compute appliance) and in general, protects the cloud-based computing system against security intrusions. This protection, in accordance with example implementations, stops a security intrusion from taking place, as compared to a security detection measure, which detects when a security intrusion (and potential harm) has already occurred so that remedial actions may be employed to mitigate future harm and/or recover from the security intrusion.

In accordance with example implementations, a reference network infrastructure state may be defined for the network infrastructure that is associated with a given compute appliance. The reference network infrastructure state defines an expected configuration for the network infrastructure that is associated with the compute appliance. In accordance with example implementations, the reference network infrastructure state includes an expected address (e.g., an Internet Protocol (IP) address) of a network access point (e.g., a ToR switch, a gateway, and so forth) for the compute appliance. The network access point may or may not be the first network component to which the compute appliance connects. For example, a network administrator may restrict the compute appliance's visibility of one or more network components closest to the compute appliance for purposes of allowing these network components to be replaced with affecting operation of the compute appliance. Such a restriction, in turn, may affect which particular network component that the compute appliance views as being the network access point. Due to the network access point location being part of the reference network infrastructure state, the compute appliance may be locked to a particular physical network connection.

The reference network infrastructure state may also include location information that is associated with the compute appliance. The location information may include, in accordance with example implementations, one or more of the following location attributes for the network access point and/or compute appliance: global navigation satellite system (GNSS) coordinates; a building address (e.g., a building number of physical address of the building); a floor number (e.g., the 5th floor) of the building in which the compute appliance and/or network access point is located; a data center identifier; an elevation (e.g., a height relative to sea level); and so forth. Due to the location information, even if the physical network connection does not change from that represented by the reference network infrastructure state, the compute appliance and/or network switch cannot be moved to a location that departs from the location information of the reference network infrastructure state. Therefore, for example, a compute appliance may not be physically moved to a less secure, unauthorized location and still be compliant with a reference network infrastructure state that specifies a different location.

The reference network infrastructure state may, in accordance with example implementations, contain data that represents other configuration criteria for the network infrastructure that is associated with the compute appliance. For example, in accordance with example implementations, the reference network infrastructure state may set forth a network compute appliance scaling policy. As another example, the reference network infrastructure state may set forth that a certain group of compute appliances may be added one at a time or specify that the certain group may be added all at once to the cloud-computing based system. As another example, the reference network infrastructure set may specify criteria for an SDN connection of a compute appliance. For example, the reference network infrastructure set may specify a minimum bandwidth for an SDN connection of a compute appliance. Such minimum bandwidth criteria may be used, for example, to protect against a denial-of-service attack. As another example, the reference network infrastructure state may specify criteria for an SDS connection for the compute appliance. For example, if the compute appliance is located in a jurisdiction that has strict privacy regulations, the reference network infrastructure state may specify that data storage for the compute appliance is not to be located outside of that jurisdiction. As another example, the reference network infrastructure state may specify a certain SDC machine instance signature for the compute appliance.

Referring to FIG. 1, as a more specific example, in accordance with some implementations, a cloud-based computing system 100 that is affiliated with a particular cloud operator may provide multi-tenant cloud services for multiple clients, or tenants. The cloud services may be any of a number of different cloud services, such as Software as a Service (SaaS), Infrastructure as a Service (IaaS), Platform as a Service (PaaS), and so forth. Moreover, depending on the particular implementation, the cloud services may be affiliated with one of several different cloud infrastructures, such as a public cloud that is generally available to all potential users over a public network; a limited access private cloud that is provided over a private network (e.g., cloud services provided by an on-site data center); or a hybrid cloud that is a combination of public and private clouds.

The tenants may access compute appliances 110 (e.g., compute nodes) of the cloud computer system 100 via cloud clients (e.g., laptops, desktop computers, smartphones, tablet computers, wearable computers, and so forth). As depicted in FIG. 1, the compute appliances 110 may be interconnected by physical network fabric 184. In general, the physical network fabric 184 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof. As depicted in FIG. 1, the compute appliances 110 may be interconnected by logical connections 194 (e.g., SDN, SDC and SDS connections) that are overlayed on the physical network fabric 184.

FIG. 1 depicts details of a specific compute appliance 110-1 of the cloud-based computing system 100, in accordance with example implementations. As described further herein, the compute appliance 110-1 has onboard features to enforce compliance of the compute appliance 110-1 with a reference compute state for the compute appliance 110-1.

The compute appliance 110-1, in accordance with example implementations, at a given time, is in one of a pre-boot environment or a runtime environment. Although FIG. 1 depicts both pre-boot components and runtime components of the compute appliance 110-1, it is understood that pre-boot components are not present in the runtime environment, and runtime components are not present in the pre-boot environment. For example, a pre-boot supervisory service 156 of the compute appliance 110-1 executes in the pre-boot environment and does not execute in the runtime environment. As another example, tenant runtime environments 120 and runtime supervisory services 150 are present in the runtime environment and not present in the pre-boot environment.

In accordance with example implementations, the compute appliance 110-1 starts up (e.g., boots in response to a power one, a reset, a power up controlled via a remote management network, a reset controller via a remote management network, and so forth) in the pre-boot environment. In this context, the "pre-boot environment" of the compute appliance 110-1 refers to the environment of the compute appliance 110-1 before the compute appliance 110-1 provides tenant runtime environment(s) 120 to the cloud tenant(s). The pre-boot supervisory service 156 operates in the pre-boot environment. A CPU 116 of the compute appliance 110-1 may execute BIOS 165 or UEFI 169 instructions to provide at least some functions of the pre-boot supervisory service 156. These functions may include the CPU 116 communicating with one or multiple smart I/O peripherals 180 of the compute appliance 110-1 and communicating with a BMC 123 of the compute appliance 110-1. In accordance with some implementations, one or multiple smart I/O peripherals 180 may be installed in respective slot connectors 181 (e.g., PCIe connectors).

The pre-boot supervisory service 156, in accordance with example implementations, may set up the tenant visibility of resources of the compute appliance 110-1. Resources may be hidden from a tenant for a number of different reasons, such as, for example, the tenant not wanting to pay for the resources, controlling the quality of service (as exposing the resources may affect performance of the compute appliance 110-1), and so forth. In accordance with some implementations, the pre-boot supervisory service 156 may control the visibility of certain physical function(s) and/or virtual function(s) of a smart I/O peripheral 180 accordingly so that the function(s) are not exposed to the domain manager 190. The resources that are hidden may be any of a number of different resources, such as devices (e.g., graphics processing units (GPUs), CPUs, NVMe drives, and so forth), memory above a certain capacity, CPU core frequency above a certain limit, and so forth.

In general, the pre-boot supervisory service 156 may take an inventory of the logical and physical infrastructure resources of the compute appliance 110-1; control the visibility of resources of the compute appliance 110-1; and set up the tenant runtime environments 120. The pre-boot supervisory service 156, in accordance with example implementations, searches for the domain manager 190 (e.g., the pre-boot supervisory service 156 searches over an encrypted overlay network) and binds the compute appliance 110-1 to the domain manager 190 for control. As part of performing the pre-boot supervisory service 156, the CPU 116 may, for example, set up a PCIe configuration space of one or multiple smart I/O peripherals 180.

In accordance with example implementations, the pre-boot supervisory service 156 has a component, a compute state verification engine 157, which enforces compliance of the compute appliance 110-1 with a reference compute state 138 for the compute appliances 110-1. In accordance with some implementations, the compute state verification engine 157 may be provided by one or multiple CPUs 116 executing host operating system instructions 163.

Compute appliances 110 of the cloud-based computing system 100 may or may not have architectures similar to or the same as the compute appliance 110-1, in accordance with example implementations. Moreover, in accordance with example implementations, one or multiple of these other compute appliances 110 may or may not have features to enforce compliance of the compute appliances 110 with respective reference operating states.

The cloud-based computing system 100 may include one or multiple domain managers 190. The domain manager 190 may be coupled to the physical network fabric 184 and the logical connections 194. Depending on the particular implementation, the domain manager 190 may be located on the compute appliance 110-1, located on another compute appliance 110, located on a dedicated administrative node, distributed across multiple nodes of the cloud computer system 100 and so forth. In general, the domain manager 190 contains physical hardware resources and logical software resources for managing a group of the compute appliances 110, called a "domain." The cloud-based computing system 100 may have one or multiple domains. In accordance with some implementations, the domain manager 190 may be associated with a database that stores data pertaining to the compute appliances 110, such as data representing compute appliance configurations, telemetry logs, audit logs, and so forth. The domain manager 190 may include an orchestration engine that manages the operation of leaf managers of the cloud computing system 100 for purposes of controlling the lifecycles and configuring the leaf resources (e.g., smart input/output (I/O) peripherals 180, described herein) of the system 100. In accordance with some implementations, the domain manager 190 may communicate intent-based commands (e.g., Redfish commands) with one or multiple vendor root managers (not shown). The vendor root manager contains physical hardware resources and logical software resources to translate the intent-based commands to vendor-specific commands for the leaf resources that are associated with a particular vendor, and these vendor-specific commands may be processed by leaf resource managers (not shown) for the leaf resources. Depending on the particular implementation, the vendor root managers and leaf resource managers may be disposed on one or multiple administrative nodes, may be distributed on one or multiple compute appliances 110, and so forth.

In accordance with example implementations, the domain manager 190 includes a network infrastructure state verification engine 193. The network infrastructure state verification engine 193, in accordance with example implementations, enforces compliance of the network infrastructure of the cloud-based computing system with an expected, or reference, network infrastructure state. This enforcement may include, in accordance with example implementations, enforcing compliance of a network infrastructure that is associated with a given compute appliance 110 with a reference network infrastructure state for this network infrastructure.

The compute appliance 110-1 may be a computer platform, in accordance with example implementations. In this context, a "computer platform" refers to a unit that includes a chassis and hardware that is mounted to the chassis, where the hardware is capable of executing machine-executable instructions (or "software"). A blade server is an example of a computer platform, in accordance with an example implementation. The computer platform may, however, be a platform other than a blade server, in accordance with further implementations, such as a rack-mounted server, a client, a desktop, a smartphone, a storage array, a laptop computer, a tablet computer, and so forth.

For example implementations in which the computer platform is a blade server, the server may have a frame, or chassis; one or multiple motherboards may be mounted to the chassis; and each motherboard may contain one or multiple multicore central processing unit (CPU) semiconductor packages (or "sockets" or "chips"). In accordance with example implementations, the blade server may have a form factor, mechanical latch(es) and corresponding electrical connectors for purposes of allowing the server blade to be installed in and removed from a corresponding server blade opening, or slot, in rack-mounted blade enclosure.

The compute appliance 110-1 may have a disaggregated, or distributed, architecture in accordance with further example implementations. In this manner, for these implementations, the components of the compute appliance 110-1 are not co-located on a single computer platform, but rather, the components of the compute appliance 110-1 may be distributed over multiple computer platforms. Moreover, the components of the compute appliance 110-1 may be distributed across multiple geographical locations (e.g., distributed over multiple data centers that have different geographical locations).

In accordance with example implementations, the compute appliance 110-1 may have a cloud-segmented architecture in which smart I/O peripherals 180 of the compute appliance 110-1 may control different logical connection segments independently from the host of the compute appliance 110-1. The compute appliance 110-1 may provide one or multiple tenant runtime environments 120 that are within a cloud tenant domain 111. As an example, the tenant runtime environments 120 may be machine abstractions that are provided for one or multiple cloud tenants. As more specific examples, the tenant runtime environments 120 may include one or multiple operating system (OS) bare metal abstractions, one or multiple virtual machine abstractions, and so forth.

In this context, a "virtual machine," or "VM" (also called a "guest virtual machine," a "virtual machine instance," or "a guest virtual machine instance") refers to a virtual environment that functions as a machine level abstraction, or virtual computer system, which has its own physical resources (e.g., CPU(s), system memory, network interface(s) and storage). Moreover, the VM may have its own abstraction of an operating system; and in general, the VM is a virtual abstraction of hardware and software resources of the compute appliance 110-1. The lifecycle (e.g., the deployment and termination) of the VM may be managed by a virtual machine monitor (VMM), or hypervisor 167, of the compute appliance 110-1. Alternatively, a VM may be managed by a kernel-based VM, or "KVM."

In accordance with example implementations, each tenant runtime environment 120 may have an OS, hypervisor, or KVM interface 121 (called an "OS/hypervisor/KVM interface 121"), and collectively, the OS/hypervisor/KVM interfaces 121 may form a tenant workload isolation barrier 197 between the cloud tenant domain 111 and a cloud operator domain 113 of the compute appliance 110-1. In accordance with example implementations, the cloud tenant domain 111 is considered to be an untrusted domain of the cloud computing system 100, as the domain 111 is associated with cloud tenant software. The cloud operator domain 113 may be considered to be a trusted domain relative to the cloud tenant domain 111.

In accordance with example implementations, the cloud operator domain 113 includes a blended physical and logical infrastructure, including physical hardware and trusted supervisory software components. The components associated with the supervisory services described herein are isolated from tenant workloads by the tenant workload isolation barrier 197 and a tenant workload isolation barrier 198 that is formed by the host interfaces of the smart I/O peripherals 180. In accordance with example implementations, the smart I/O peripherals 180 form a network isolation barrier 199 of the compute appliance 110-1. As an example, the physical hardware components associated with the supervisory services may include one or multiple central processing units (CPUs) 116 and memory components that form a system memory 118.

In accordance with example implementations, the system memory 118 and other memories that are discussed herein are non-transitory storage media that may be formed from semiconductor storage devices, memristor-based storage devices, magnetic storage devices, phase change memory devices, a combination of devices of one or more of these storage technologies, and so forth. The system memory may represent a collection of both volatile memory devices and non-volatile memory devices.

The CPU(s) 116 may execute machine-executable instructions 117 to form various trusted supervisory software components of the compute appliance 110-1, such as a basic input/output system (BIOS) 165, a Unified Extensible Firmware Interface (UEFI) 169, a host operating system 163 and a hypervisor 167. As also depicted in FIG. 1, the smart I/O peripherals 180 are within the cloud operator domain 113. The cloud operator domain 113 may, in accordance with example implementations, include one or multiple host supervisory services that are provided by trusted supervisory software component(s). For example, the cloud operator domain 113 may include a pre-boot supervisory service 156 and one or multiple runtime supervisory services 150 that operate during the or runtime of the compute appliance 110-1, in accordance with example implementations. In general, as described herein, the supervisory services 150 and 156 may serve a wide variety of purposes for the compute appliance 110-1, which bridge the architecture gap between the host-centric control model and the cloud-native control model.

As examples, in accordance with some implementations, the runtime host supervisory services 150 may include one or multiple of the following: a hypervisor-VM runtime supervisory service 150 (e.g., a service as a privilege virtual machine in the hypervisor) and an OS-bare metal runtime supervisory service 150 (e.g., a service provided by the UEFI 169 and/or BIOS 165). The pre-boot supervisory service 156 may be provided by the UEFI 169 and/or the BIOS 165. The pre-boot supervisory service 156 may, for example, provided by an embedded operating system, such as intelligent provisioning operating system.

In accordance with example implementations, the compute state verification engine 157, in response to a startup of the compute appliance 110-1, determines an actual compute state for the compute appliance 110-1. In accordance with some implementations, the compute state verification engine 157 provides a barrier that prevents the compute appliance 110-1 from providing the tenant runtime environments 120 until the compute state verification engine 157 verifies that that the compute appliance 110-1 complies with the reference compute state. In accordance with example implementations, data representing the reference compute state 138 for the compute appliance 110-1 may be stored in a secure memory 134 of the compute appliance 110-1. For the example implementation that is depicted in FIG. 1, the secure memory 134 may be a memory whose access is controlled by a security gateway component, such as a BMC 123. Other secure memories may be used, in accordance with further implementations.

In the runtime environment of the compute appliance 110-1, a runtime supervisory service 150 of the compute appliance 110-1 may enforce compliance of the compute appliance 110-1 to the reference compute state in response to a hot plug/unplug event, as further described herein. In accordance with some implementations, the runtime supervisory service 150 may be formed by a CPU 116 executing operating system 163 instructions. Enforcing compliance of the compute appliance 110-1 to the reference compute state may involve the runtime supervisory service 150 taking one or multiple actions responsive to noncompliance being detected, such as actions that involve quiescing operations of the compute appliance 110-1 with the cloud-based computing system 100; powering down the compute appliance 110-1; returning the compute appliance 110-1 to the pre-boot environment; isolating, or quarantining the compute appliance 110-1 from the cloud-based computing system 110-1; ceasing providing the tenant runtime environments 120; cryptographically erasing persistent storage devices and memory devices on and associated with the compute appliance 110-1; and so forth. In this context, "cryptographically erasing" a device refers to removing access to a cryptographic key that would might allow recovering the corresponding plaintext content. For example, a self-encrypting drive (e.g., an NVMe drive) may internally store and use a media access key to encrypt and decrypt the data that is stored in the drive, and cryptographically erasing the self-encrypting drive may, for example, include removing or erasing the drive's media access key.

In accordance with some implementations, event notifications (e.g., fault notifications, error notifications, hot plug events, security-related event notifications, and so forth) for the compute appliance 110-1 are directed to a management controller of the compute appliance 110-1. For the example implementations that are described herein, the management controller is the BMC 123. However, in accordance with further implementations, the management controller may be another component, such as a chassis management controller, a platform controller, the domain manager 190, and so forth.

In general, as used herein, a "BMC" is a specialized service processor that monitors the physical state of a server, node, or other hardware entity using sensors and communicates with a management system through a management network. In accordance with example implementations, the BMC operates under the control of a supervisory service (e.g., supervisory service 150 or 156) or domain manager (e.g., domain manager 190), which serves as the BMC owner. The BMC may communicate with applications executing at the operating system level through an input/output controller (IOCTL) interface driver, a representational state transfer (REST) application program interface (API), or some other system software proxy that facilitates communication between the BMC and applications. The BMC may have hardware level access to hardware devices of the hardware entity, including a system memory, local memories, and so forth. The BMC may be able to directly modify the hardware devices. The BMC may operate independently of any operating system instances of the hardware entity. The BMC may be located on a motherboard or main circuit board of the hardware entity. The fact that the BMC is mounted on the motherboard or otherwise connected or attached to the motherboard does not prevent the BMC from being considered "separate" from the processors, which are being monitored/managed by the BMC. As used herein, a BMC has management capabilities for sub-systems of the hardware entity, and is separate from a processing resource that executes an operating system of the computing device.

Regardless of its particular form or implementation, the BMC 123 may include one or multiple embedded processors 124 that execute machine-readable instructions 125 (stored in a memory 126 of the BMC 123), for purposes of performing actions by the BMC 123, as described herein. In accordance with example implementations, these actions may include receiving and managing host notifications. Moreover, in accordance with some implementations, the BMC 123 may control access to the secure memory 134. The secure memory 134 may be a non-volatile memory, and in accordance with example implementations, the secure memory 134 may store data representing audits logs 136 and a reference compute state 138.

The audit logs 136 may be used to record events with the compute appliance 110-1. In accordance with example implementations, the audit log 136 a journal, or digest, containing data that describes security/control updates to the node infrastructure reference set 138 and the network infrastructure reference set 142. The audit logs 136 may be used as a proof operating state of the compute appliance 110-1, by analyzing/tracing the full aggregated audit log records. In accordance with some implementations, the records in the audit logs 136 may be timestamped. In accordance with some implementations, records in the audit logs 136 may be stamped, or tagged, with one of multiple values from one or multiple operation time meters 135 (or "Hobbs meters"). As an example, in accordance with some implementations, the BMC 123 may maintain an operation time meter 135 to keep tract of the total on time of the compute appliance 110-1 since the compute appliance 110-1 entered service and another odometer 135 to keep a running count of the total number of power cycles of the compute appliance 110-1. In accordance with example implementations, the BMC 123 may maintain the audit logs 136.

In accordance with some implementations, the reference compute state 138 may designate an aggregation component of the compute appliance 110-1 for gathering network infrastructure state-related information (e.g., network infrastructure reference state information specific about the compute appliance 110-1, such as the network access point IP address, location information for the compute appliance 110-1, SDN connection attributes, SDS connection attributes, and so forth) and reporting this information to the domain manager 190.

The BMC 123 may provide a wide variety of other management services, other than those described above, such as monitoring sensors (e.g., temperature sensors, cooling fan speed sensors); monitoring an operating system status; monitoring power statuses; controlling power on and power off of the computer system; logging computer system events; allowing remote management of the computer system; performing recovery operations after an operating system or computer system failure; and so forth. In accordance with some implementations, the BMC 123 may also have a security plane, in which the BMC 123 performs various security-related functions for the compute appliance 110-1, such as validating firmware before the firmware is allowed to be loaded and executed by the processor 124; storing, generating and providing cryptographic keys; and so forth. In accordance with some implementations, the BMC 123 may manage the audit logs 136 as part of its security plane. In accordance with example implementations, the BMC 123 is under the control of a supervisory service (e.g., supervisory service 150 or 156) or domain manager 190, with the sole exception being if compliance with the reference compute state 138 is not verified. In this manner, if the compute state verification engine 157 fails to verify the reference compute state 138 (i.e., the compute appliance 110-1 is not in compliance with the reference compute state 138), then in accordance with example implementations, after the compute appliance 110-1 is quarantined, or isolated, from the cloud-based computing system 100, a server administrator role may be activated with a service password for purposes of managing the compute appliance 110-1 via the BMC 123.

In accordance with example implementations, the compute appliance 110-1 may have one or multiple sensors that provide data representing attributes of the compute appliance 110-1. For example, in accordance with some implementations, the compute appliance 110-1 may include one or multiple GNSS radios 102 that provide data representing a physical location of the compute appliance 110-1 or the physical location of a particular component of the compute appliance 110-1. As another example, in accordance with some implementations, the compute appliance 110-1 may include an altimeter that provides data representing an elevation of the compute appliance 110-1 or an elevation of a particular component of the compute appliance 110-1. As another example, in accordance with some implementations, the compute appliance 110-1 may include a tamper sensor that provides data representing whether tampering has occurred with a component or part of the compute appliance 110-1. Although not depicted in FIG. 1, in a similar manner, the physical network fabric 184 may include one or multiple sensors that provide data representing attributes (e.g., an elevation, GNSS coordinates, and so forth) of one or multiple network devices (e.g., network switches, gateways, ToR switches, and so forth) of the physical network fabric 184.

Figure 2:
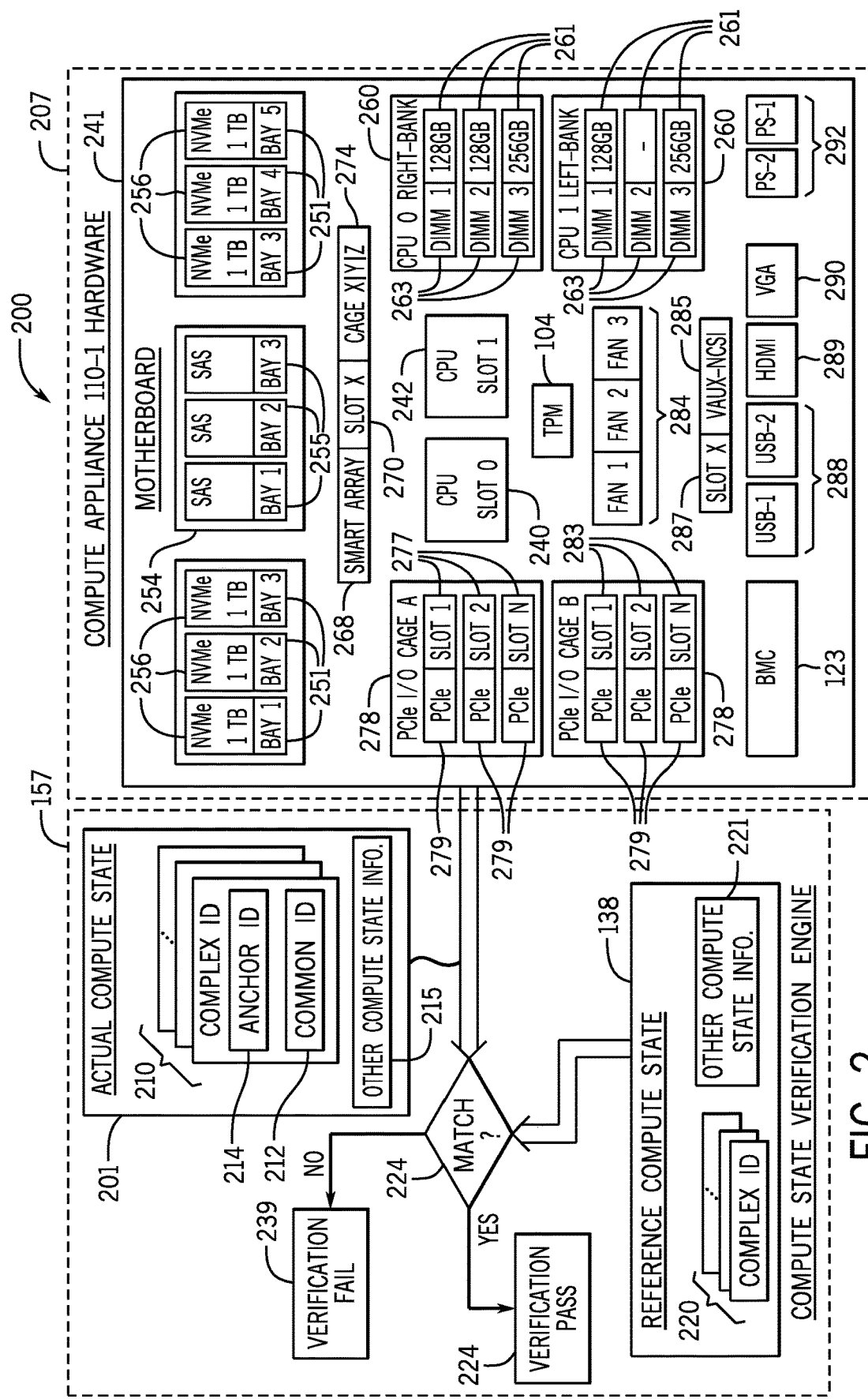
FIG. 2 is an illustration of a process that is performed by a compute state verification engine of the compute appliance of FIG. 1 according to an example implementation.

FIG. 2 illustrates a process 200 to verify a compute state of the compute appliance 110-1 according to an example implementation. Referring to FIG. 2 in conjunction with FIG. 1, the process 200 includes the compute state verification engine 157 determining an actual compute state 201 of the compute appliance 110-1. In accordance with example implementations, the actual compute state 201 includes a set of complex IDs 210. Each complex ID 210 may, in accordance with example implementations, include an anchor ID 214 and a common ID 212. The actual compute state 201 may include additional configuration information 215 for the compute appliance 110-1, such as the designation of an aggregation component of the compute appliance 110-1 to collect data representing a network infrastructure state specific to the compute appliance 110-1 and send this data to the domain manager 190; one or multiple hot plug/unplug policies of the compute appliance 110-1; policies for resilient subsystems (e.g., RAID subsystems) of the compute appliance 110-1; a designation of a component to communicate the audit logs 136 to the domain manager 190; a cryptographic erasure policy for persistent memory and/or storage devices; a policy for handling program execution crashes; a minimum firmware version; a specific firmware version, an access control list authorizing updates specific credentials to update firmware; and so forth.

In accordance with example implementations, the anchor ID 214 identifies a corresponding component of the compute appliance 110-1. The anchor ID 214 may include, as an example, one or more of the following attributes of the component: a serial number, a model number, a media access control (MAC) address, a unique identifier, and so forth. Moreover, in accordance with example implementations, the anchor ID 214 may be formed from a concatenation of the foregoing elements, and in accordance with some implementations, this concatenation may be encrypted with a private part (or "private key") of an asymmetric key such that the corresponding public part (or "public key") may be used to decrypt the anchor ID 214 into plaintext form. The anchor ID 214 may also represent a particular category or class of hardware component, without identifying a unique hardware component. For example, in accordance with example implementations, the anchor ID 214 may identify a minimize storage size for the hardware component, a particular manufacturer of the hardware component, a minimum processor specification for the hardware component, a model number for the hardware component, a range of model numbers for the hardware component, a particular attribute of the hardware component, a serial number range for the hardware component, a maximum power dissipation for the hardware component, an electromagnetic interference rating range for the hardware component, and so forth.

The common ID 212, in accordance with example implementations, represents a physical topological, or spatial, attribute of the component. In accordance with example implementations, the physical topological attribute may correspond to a manufacturing process ID location (e.g., a motherboard silkscreen label). As a more specific example, FIG. 2 depicts various hardware components 207 of the compute appliance 110-1, in accordance with example implementations. At least some of the hardware components 207 may be located on or mounted in relation to a motherboard 241 of the compute appliance 110-1. Although the motherboard 241 is depicted in FIG. 2 as an example, it is understood that, in accordance with example implementations, the compute appliance 110-1 may have other circuit card substrates, or circuit boards, such as mezzanine boards, one or additional motherboards, riser cards, and so forth; and hardware components corresponding to particular complex IDs 210 may be located on one or multiple of these circuit boards.

For the example implementation that is depicted in FIG. 2, NVMe devices 256 are installed in corresponding bays 251, which are mounted to the motherboard 241. The bays 251 may be ordered, or numbered, such that a particular NVMe device 256 may be installed in bay number one, another NVMe device 256 may be installed in bay number four, and so forth. It is noted that some of the bays 251 may be empty, i.e., the bay 251 may not have an installed NVMe device 256. The corresponding complex ID 210 for an NVMe device 256, in accordance with example implementations, includes an anchor ID 214 (e.g., an encrypted serial number for the NVMe device 256) and a common ID 212 (e.g., an identifier for the particular bay 251 in which the NVMe device 256 is installed). Therefore, in accordance with example implementations, the complex ID 210 for a given component of the compute appliance 110-1 uniquely identifies the component as well as identifies the physical topological location of the component in the compute appliance 110-1. An NVMe device 256 that is installed into a particular bay 251 has a different corresponding common ID 212 (and correspondingly, a different complex ID 210) than the common ID 212 for the same NVMe device 256 if installed into another bay 251.

The complex IDs 210 may correspond to many different types of components of the compute appliance 110-1 and their corresponding physical topological locations, in accordance with example implementations. For example, the actual node infrastructure set 201 may include complex IDs 210 for PCIe devices 279. For example, a particular complex ID 210 may uniquely identify a corresponding PCIe device 279, as well as a PCIe I/O cage 278 and PCIe slot 277 in which the PCIe device 279 is installed.

As another example, another set of complex IDs 210 may represent DIMMs 263. In this manner, a given complex ID 210 may include an anchor ID 214 that uniquely identifies a particular DIMM 263, and the corresponding common ID 212 may identify a bank 260 and a particular slot 261 within the particular bank 260 in which the DIMM 263 is installed.

As another example, a particular set of complex IDs 210 may be associated with serial attached small computer system interface (SCSI), or "SAS," devices 254. For this set of complex IDs 210, the anchor ID 214 of a particular complex ID 210 may uniquely identify a particular SAS device 254, and the corresponding common ID 212 may identify the number of a bay 255 in which the SAS device 254 is installed.

As another example, a particular complex ID 210 may correspond to a smart array 268. In this manner, the complex ID 210 may include an anchor ID 214 that uniquely identifies the smart array 268. The corresponding common ID 212 may identify the particular cage 274 in which the smart array 268 is installed and a particular number of a slot 270 within the cage 274.

In accordance with some implementations, a particular complex ID 210 may correspond to a network controller sideband interface (NC-SI) controller 285, and the common ID 212 may represent the particular slot 287 in which the NC-SI controller 285 is installed.

In accordance with example implementations, one or multiple complex IDs 210 may correspond to components of the compute appliance 110-1 that are not installed in a particular slot connector. For example, in accordance with some implementations, one or multiple complex IDs 210 may correspond to universal serial bus (USB) connectors 288. Moreover, in accordance with some implementations, one or multiple complex IDs 210 may correspond to high-definition multimedia interface (HDMI) connectors 289, one or multiple video graphics adapter (VGA) connector 290, and so forth.

One or multiple complex IDs 210 may correspond to power supplies 292 of the compute appliance 110-1. In this manner, each power supply 292 may be connected to a particular power harness connector of an ordered set of harness connectors, and the common ID 212 for a particular power supply 292 may identify the particular power harness number for the power supply 292. As another example, in accordance with some implementations, one or multiple complex IDs 210 may correspond to fans 284 of the compute appliance 110-1. In this manner, the fans 284 of the compute appliance 110-1 may be connected to a different wiring harness of a set of ordered wiring harnesses. The common ID 212 for a particular fan 284 represents the specific wiring harness number to which the fan 284 is connected.

In accordance with further example implementations, the compute appliance 110-1 may have various and/or different components that are set forth herein and corresponding complex IDs 210 for these components.

As depicted in FIG. 2, in accordance with example implementations, the process 200 for verifying the compute node state of the compute appliance 110-1 includes the compute state verification engine 157 determining (decision block 224) whether the actual compute state 201 matches the reference compute state 138. In accordance with example implementations, this determination may involve determining whether each complex ID 220 of the node infrastructure reference set 138 has a matching complex ID 210 of the actual compute state 201. Moreover, in accordance with example implementations, the decision 224 of whether the actual compute state 201 matches the reference compute state 138 may involve determining whether there are additional complex IDs 210 of the actual node infrastructure set 200 that do not have corresponding complex IDs 220 in the node infrastructure reference set 138. The decision 224 may also involve determining whether configuration information 215 of the actual compute state 201 matches configuration information 221 of the reference compute state 138. In accordance with example implementations, the complex IDs and other configuration items may have a certain order in which these elements are to appear in the states 201 and 138 (e.g., DIMMs are listed in the order before PCIe devices and NVMe devices, and so forth).

Determining whether the actual compute state 201 matches the reference compute state 138 may involve determining a hash, or hash value, for the reference compute state 138 and a corresponding hash value for the actual compute state 201. If the hash values are the same, then, in accordance with example implementations, a match has occurred. Otherwise, if the hash values are different, then the actual compute state 201 is deemed to not match the reference compute state 138. Other ways may be used to determine whether the actual compute state 201 matches the reference compute state 138, in accordance with further implementations.

In accordance with example implementations, if the actual compute state 201 matches the reference compute state 138, then the verification passes, as depicted at reference numeral 224. Conversely, if the actual compute state 201 does not match the reference compute state 138, then the verification fails, as depicted at reference numeral 239.

Figure 3:
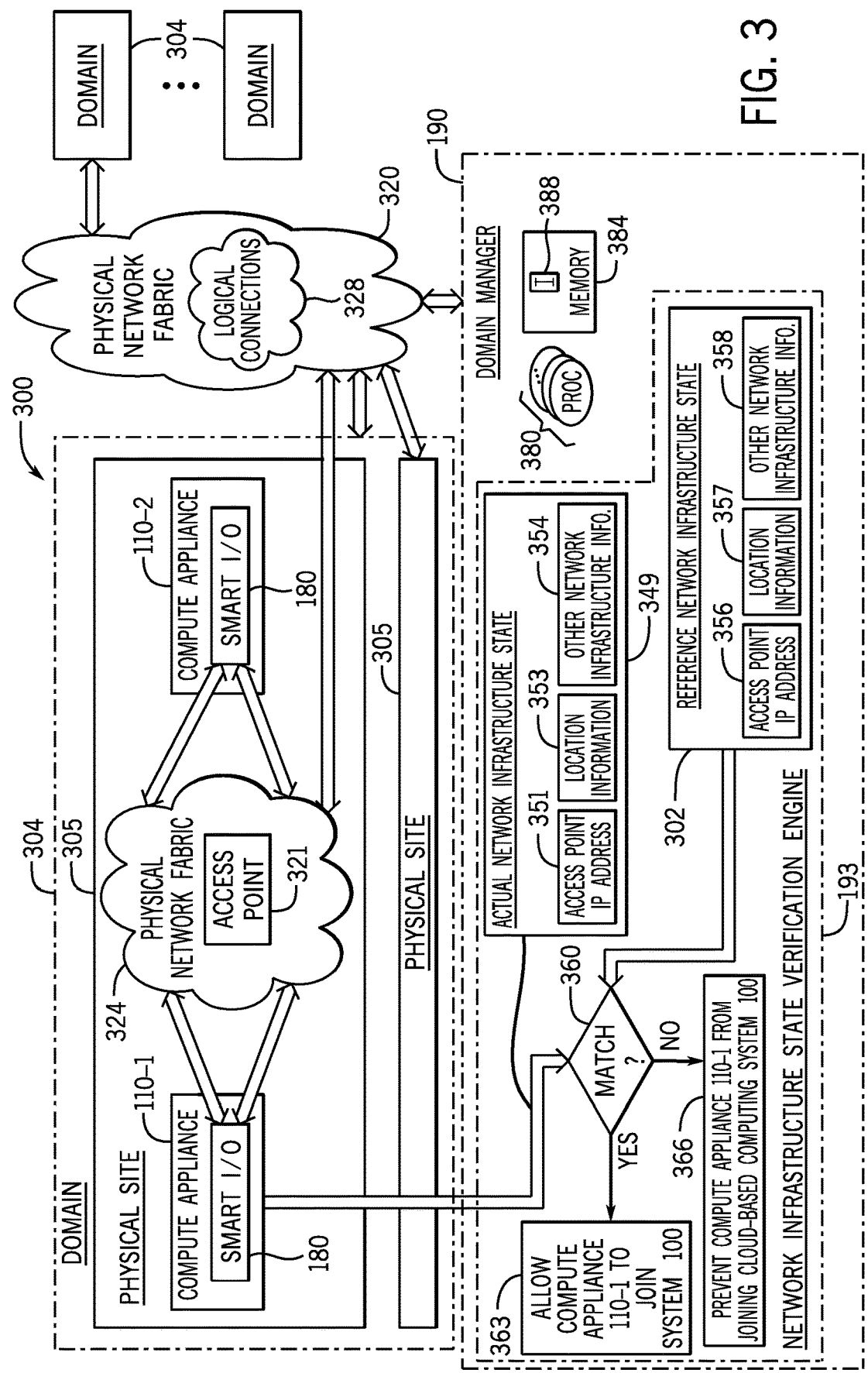
FIG. 3 is an illustration of a process that is performed by a domain manager to enforce compliance of a network infrastructure that is associated with a compute appliance with a reference network infrastructure state according to an example implementation.

FIG. 3 depicts a process 300 used by the network infrastructure state verification engine 193 of the domain manager 190 to verify a network infrastructure that is associated with the compute appliance 110-1, in accordance with example implementations. The domain manager 190 may include one or multiple hardware processors 380 (e.g., CPUs) and a memory 384 that may store instructions 388 that, when executed by the domain manager 190, cause the domain manager 190 to perform actions as described herein. Moreover, in accordance with example implementations, execution of the instructions 388 by the processor(s) 380, cause the processor(s) 380 to form the network infrastructure state verification engine 193.

Referring to FIG. 3 in conjunction with FIG. 1, in accordance with some implementations, the compute appliance 110-1 may be one of multiple compute appliances (e.g., a set of compute appliances 100 including compute appliances 110-1 and compute appliances 110-2, as depicted in FIG. 3, as well as other compute appliances 110) that are located at a particular physical site 305 (e.g., a datacenter). A given domain 304 may include compute appliances 110 from one or multiple physical sites 305, as depicted in FIG. 3. The compute appliances 110, in general, may be physically connected to network fabric 320. These connections may include logical connections 328 and physical and network connections 324. As depicted in FIG. 3, the logical connections 328 and the physical network connections 324 are made through the smart I/O peripheral 180 of each compute appliance 110.

In accordance with example implementations, a reference network infrastructure state 302 for the network infrastructure that is associated with the compute appliance 110-1 may include an access point IP address 356. In this manner, in accordance with example implementations, the access point IP address 356 may be the IP address of the first network component that is visible to the compute appliance 110-1. In accordance with example implementations, the network infrastructure reference set 142 may further include data that represents location information 357 associated with the compute appliance 110-1. The location information 357 may, depending on the particular implementation, represent a location of the compute appliance 110-1, a location of the network access point device, or locations of the compute appliance 110-1 and the network access point device. The location information 357 may, for example, represent a particular floor (e.g., floor number two) an office or suite number, GNSS coordinates, an elevation, a data center identifier or location, a rack number, and so forth.

The reference network infrastructure state 302 may include other configuration information 358 of the network infrastructure associated with the compute appliance 110-1, in accordance with example implementations. For example, the other configuration information 358 may include such configuration attributes as a compute appliance scaling policy, criteria for an SDN connection of the compute appliance 110-1, criteria for an SDS connection for the compute appliance 110-1, a signature of an SDC machine instance for the compute appliance 110-1, and so forth.

Pursuant to the process 300, the network infrastructure state verification engine 193 determines (decision block 360) whether the reference network infrastructure state 302 matches an actual network infrastructure state 349. In this manner, the actual network infrastructure state 349 may represent information gathered by the network infrastructure state verification engine 193 and includes such information as data representing an actual IP address 351 of a network access point device for the compute appliance 110-1, data representing location information 353 for the compute appliance 110-1 and/or location information for the network access point device, and so forth. Moreover, the actual network infrastructure state 349 may include other network information configuration information 354, such as criteria discussed above for the other information 358 of the reference network infrastructure state 302.

In accordance with example implementations, for purposes of comparing the actual network infrastructure state 349 to the reference network infrastructure state 302, the network infrastructure state verification engine 193 may determine whether the access point IP address 351 matches the access point IP address 356, determine whether the location information 353 matches the location information 357, and determine whether the other network infrastructure information 354 matches the other network infrastructure information 358. A match may not occur, for example, if any information is not the same, such as differences in the access point IP address, differences in the location information or differences in the other configuration information. If, pursuant to decision block 360, a match does not occur, then in accordance with example implementations, the verification fails and the domain manager 190 does not allow the compute appliance 110-1 to join the cloud-based computing system 100, as depicted at reference numeral 366. If a match occurs, then in accordance with example implementations, the verification passes and the domain manager 190 allows the compute appliance 110-1 to join the cloud-based computing system 100, as depicted at reference numeral 363.

Figure 4:
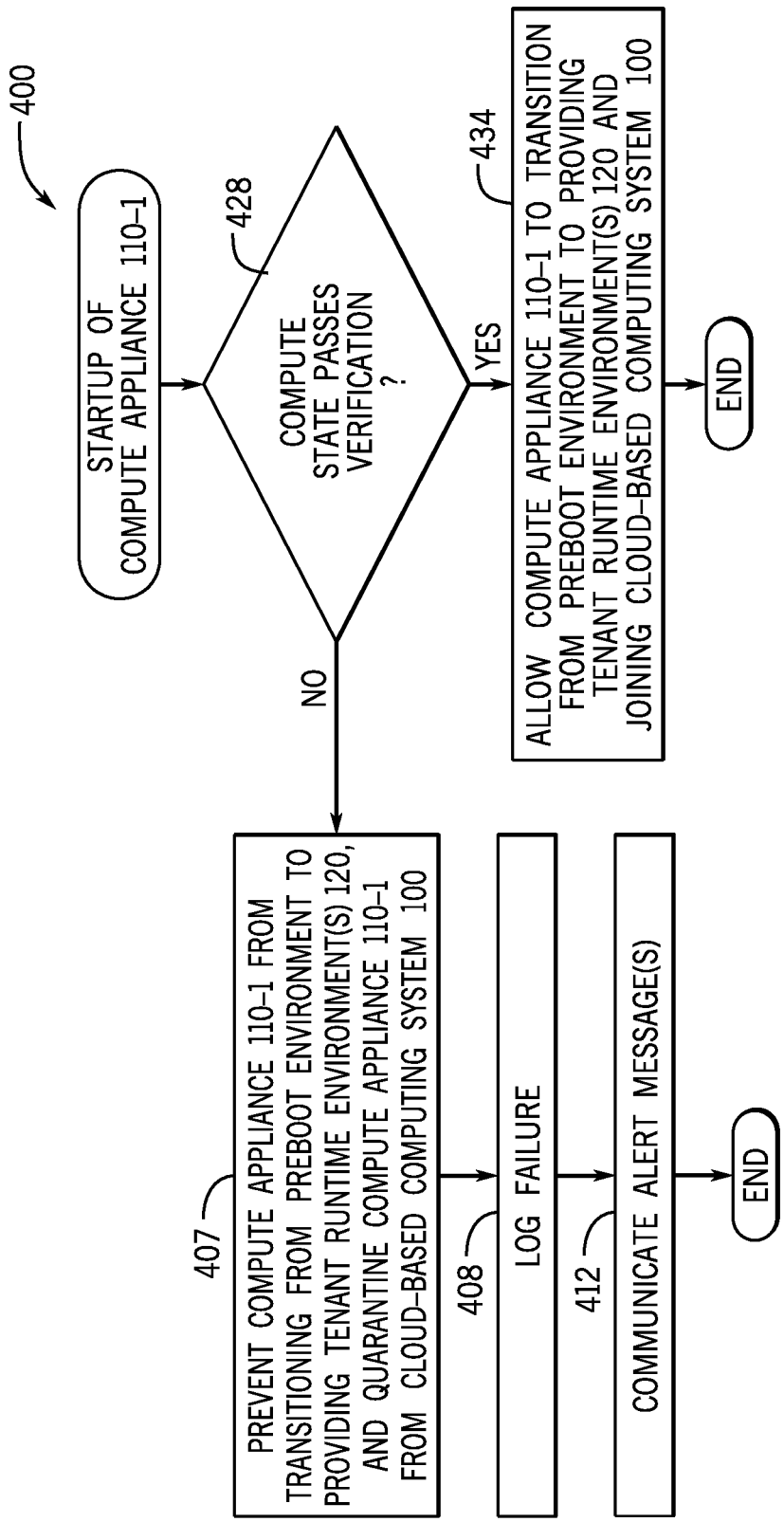
FIG. 4 is a flow diagram depicting a startup process of a compute appliance according to an example implementation.

FIG. 4 depicts a process 400 performed by the compute state verification engine 157 of the compute appliance 110, in accordance with example implementations, responsive to the startup of the compute appliance 110-1. In accordance with example implementations, the compute state verification engine 157 determines (decision block 428) whether the compute state of compute appliance 110-1 passes verification. If not, then, pursuant to block 407, the compute state verification engine 157 quarantines (block 408) the compute appliance 110-1 from the cloud computing-based system 100 and prevents the compute appliance 110-1 from transitioning to any of the tenant runtime environments 120. Moreover, in accordance with example implementations, the compute state verification engine 157 may log (block 408) the verification failure. In this manner, in accordance with example implementations, the compute state verification engine 157 may, for example, update an audit log 136 with an entry detailing the verification failure. Moreover, the compute state verification engine 157 may take one or multiple additional actions, such as, for example, communicating (block 412) one or multiple alert messages (e.g., communicating an alert message to a system administrator for the compute appliance 110-1, communicating an alert message to the domain manager 190, and so forth).

If, pursuant to decision block 428, the compute state verification engine 157 determines that the compute appliance 110-1 complies with the reference compute state 138, then the compute state verification engine 157 sets up (block 434) the tenant runtime environment(s) 120 and allows the compute appliance 110-1 to join the cloud-based computing system, as depicted in block 436.

Figure 5A:
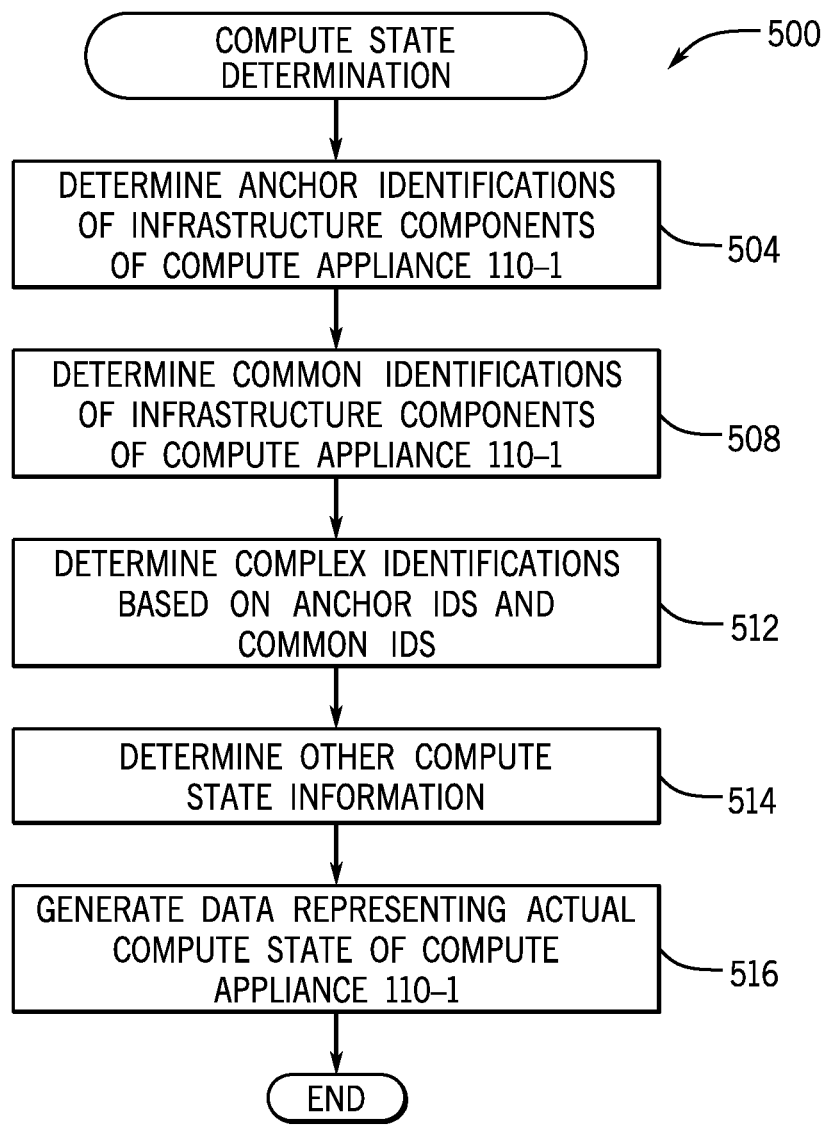
FIG. 5A is a flow diagram of a process performed by a compute state verification engine of a compute appliance to determine an actual compute state of the compute appliance according to an example implementation.

FIG. 5A depicts an example process 500 performed by the compute state verification engine 157 (FIG. 1) in response to the startup (e.g., the power on or reset of the compute appliance 110-1). Referring to FIG. 5A in conjunction with FIG. 1, in accordance with example implementations, the process 500 includes the compute state verification engine 157 determining (block 504) anchor identifications of infrastructure components of the compute appliance 110-1 and determining (block 508) common identifications of infrastructure components of the compute appliance 110-1. The compute state verification engine 157 may then, pursuant to block 512, determine complex identifications based on the anchor identifications and the common identifications. The compute state verification engine 157 may further determine (block 514) other compute state information, as described herein. The compute state verification engine 157 may then generate (block 516) data representing the actual compute state of the compute appliance 110-1.

Figure 5B:
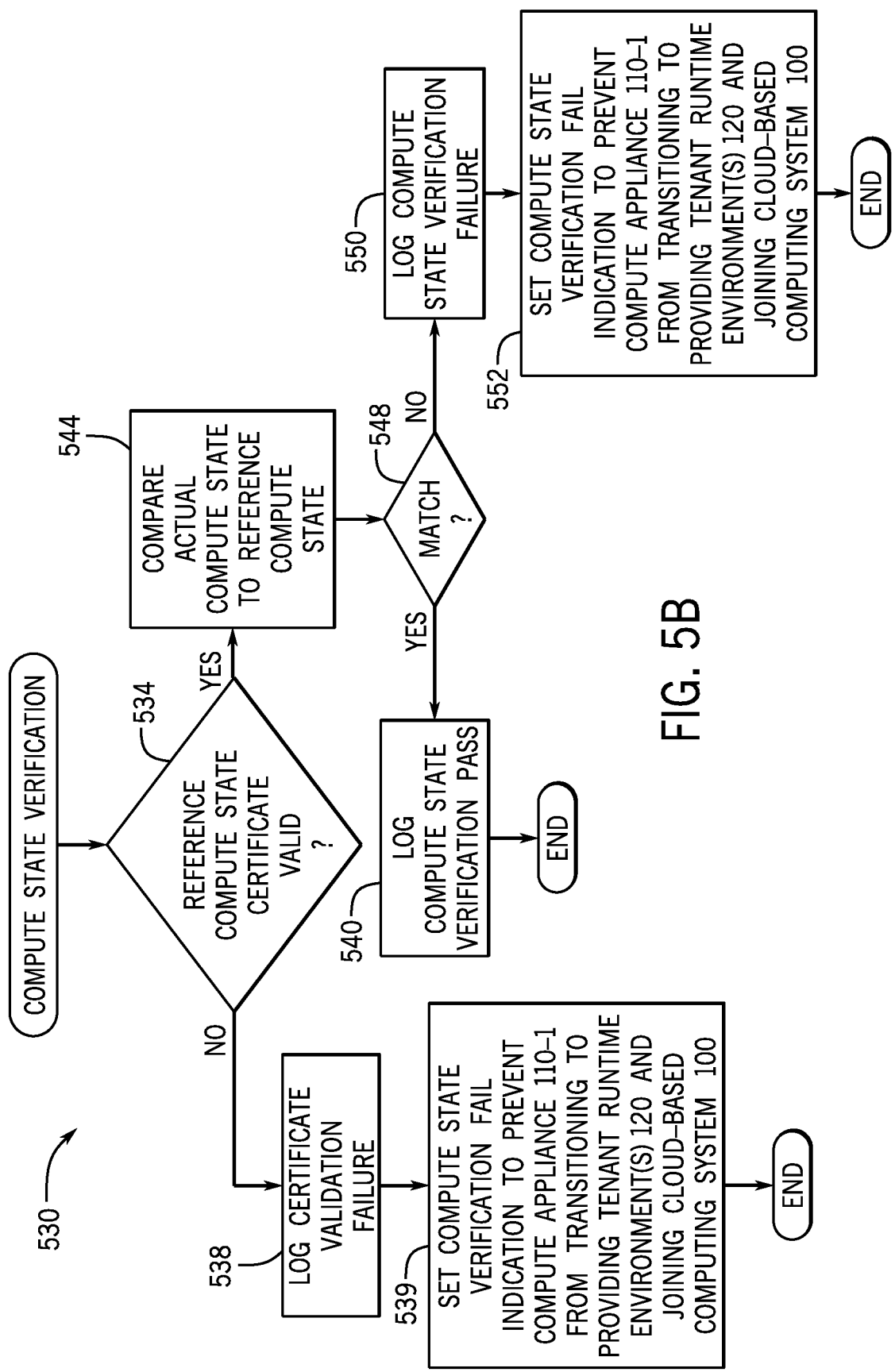
FIG. 5B is a flow diagram of a process performed by a compute state verification engine of a compute appliance to verify compliance of the compute appliance with a reference compute state according to an example implementation.

FIG. 5B depicts an example process 530 that is performed by the compute state verification engine 157, in accordance with example implementations, for purposes of verifying compliance of the compute appliance 110-1 with the reference compute state. Referring to FIG. 5B in conjunction with FIG. 1, in accordance with example implementations, the compute state verification engine 157 determines (decision block 534) whether a reference compute infrastructure certificate for the specific compute appliance 110-1 is valid. The validation of the certificate may take into account multiple factors or criteria, depending on the particular implementation. For example, the compute state verification engine 157 may first evaluate a signature of the certificate. In this manner, in accordance with example implementations, an administrator having the appropriate credentials for the compute appliance 110-1 may possess a private part (or private key) of an asymmetric cryptographic key, such as, an RSA key. The administrator may cryptographically sign the certificate based on the private key and the content of the certificate. The content of the certificate may include, for example, a reference compute state for the compute appliance 110-1. Using the public part (i.e., the public key) of the RSA key, the compute state verification engine 157 may verify the signature of the certificate by determining a hash value for the content of the certificate with the public key and comparing the resulting hash value to the signature. If these two hashes are the same, then, in accordance with example implementations, the certificate signature has been validated.

The compute state verification engine 157 may consider one or multiple additional measures to validate the reference compute state certificate, in accordance with example implementations. For example, after validating the certificate signature, the compute state verification engine 157 may determine whether the signer has the appropriate credentials to issue the certificate, whether the authority for the signer to issue the certificate has been revoked, and so forth. Moreover, the compute state verification engine 157 may verify content of the certificate for purposes of validating the certificate.

If, pursuant to block 538, the reference compute state certificate is not valid, then the compute state verification engine 157 logs the certificate validation failure and sets (block 539) a compute state verification fail indication to prevent transition of the compute appliance 110-1 from the pre-boot environment to providing the tenant runtime environment(s) 120. If, pursuant to decision block 534, the reference compute state certificate is validated, then the compute state verification engine 157 compares (block 544)

the actual compute state to the reference compute state as set forth by the content of the certificate. If the actual compute state matches the reference compute state, as determined at decision block 548, then the compute state verification engine 157 logs (block 540) the compute state verification pass. Otherwise, pursuant to decision block 548, if the comparison of the actual compute state to the reference compute state fails, then the compute state verification engine 157 logs (block 550) the compute state verification failure and sets (block 552) a compute state verification fail indication to prevent the compute appliance 110-1 from transitioning from the pre-boot environment to the tenant runtime environment(s) 120.

Figure 6A:
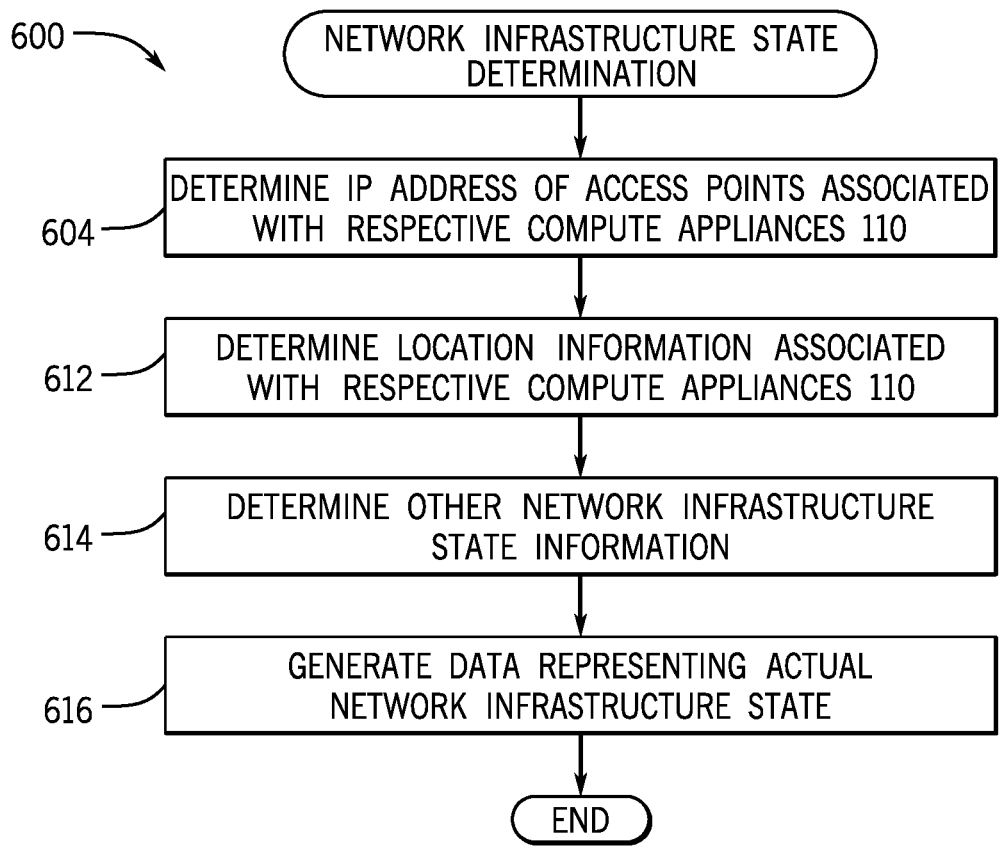
FIG. 6A is a flow diagram of a process performed by the network infrastructure state verification engine to determine an actual network infrastructure state according to an example implementation.

FIG. 6A depicts an example process 600 that is performed by the network infrastructure state verification engine 193 (FIG. 1) of the compute appliance 110-1 according to an example implementation. Referring to FIG. 6A in conjunction with FIG. 1, in accordance with example implementations, the process 600 includes the network infrastructure state verification engine 193 determining (block 604) IP addresses of network access points for compute appliances 110 and determining (block 608) location information associated with respective compute appliances 110. Pursuant to block 614, in accordance with example implementations, the network infrastructure state verification engine 193 may determine other network infrastructure state information, such as the other network infrastructure information 354 (FIG. 3) for the compute appliances 110. Pursuant to block 616, the network infrastructure state verification engine 193 generates data representing an actual network infrastructure state for the compute appliances 110.

Figure 6B:
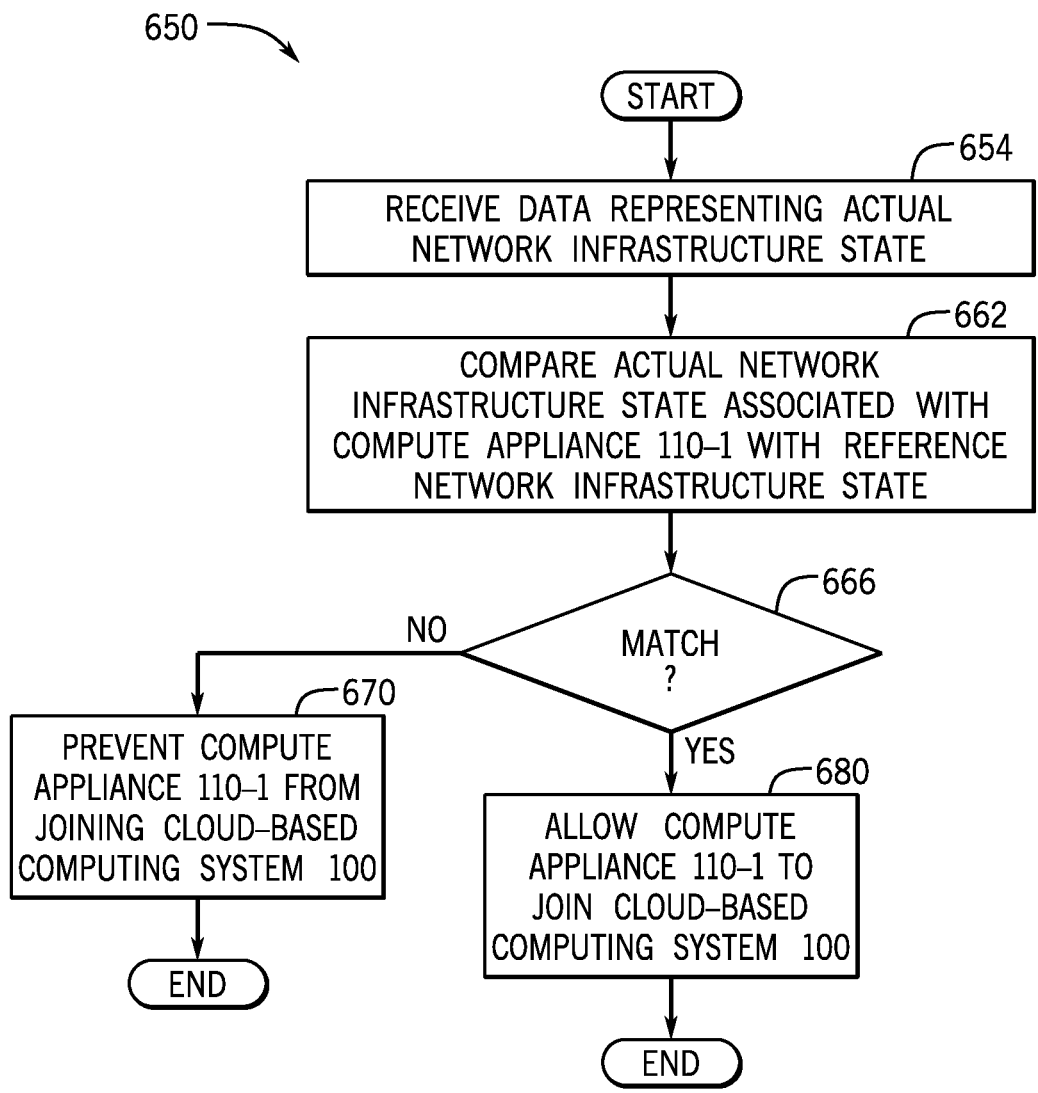
FIG. 6B is a flow diagram of a process performed by the network infrastructure state verification engine to control whether a compute appliance joins a cloud-based computing system based on whether an actual network infrastructure associated with the compute appliance complies with a reference network infrastructure state, according to an example implementation.

FIG. 6B depicts an example process 650 performed by the network infrastructure state verification engine 193, in accordance with example implementations, for purposes of enforcing a state of a network infrastructure associated with the compute appliance 110-1 to comply with a corresponding reference network infrastructure state. In accordance with some implementations, the network infrastructure state verification engine 193 may perform the process 650 as part of a determination of whether the compute appliance 110-1 is allowed to join the cloud-based computing system 100. Referring to FIG. 6B in conjunction with FIG. 1, the network infrastructure state verification engine 193 receives (block 654), or accesses, data representing the actual network infrastructure state, and the network infrastructure state verification engine 193 compares (block 662) the actual network infrastructure state to a reference network infrastructure state. If, based on this comparison, the network infrastructure state verification engine 193 determines (decision block 666) that the actual network infrastructure state matches the reference network infrastructure state, then the network infrastructure state verification engine 193 allows (block 680) the compute appliance 110-1 to join the cloud-based computing system 100. Otherwise, if the network infrastructure state verification engine 193 determines (decision block 666) that the actual network infrastructure state does not match the reference network infrastructure state, then the network infrastructure state verification engine 193 prevents (block 670) the compute appliance 110-1 from joining the cloud-based computing system 100.

Referring back to FIG. 1, components may be potentially hot plugged into hot plug connectors of the compute appliance 110-1, and components may potentially be hot unplugged from hot plug connectors of the compute appliance 110-1. In this context, "hot plugging" refers to the actual or simulated installation of a component into a connector of the compute appliance 110-1 while the connector receives power. Here, the "component" may be an actual hardware component or a virtual component. An "actual" installation may, for example, correspond to the installation of a physical card or adapter into a physical connector of the compute appliance 110-1. A "simulated" installation may, for example, correspond to a hardware component (e.g., a PCIe adapter) providing an indication to an operating system or hypervisor that a particular function (e.g., a virtual PCIe function or a physical PCIe function) is now available, or has been activated. "Hot unplugging" of a component refers to the actual or simulated removal of the component from a connector while power is provided to the connector. An "actual" removal may, for example, correspond to the removal of a physical card or adapter from a physical connector of the compute appliance 110-1. A "simulated" removal may, for example, correspond to a hardware component (e.g., a PCIe adapter) providing an indication to an operating system or hypervisor that a particular function (e.g., a virtual PCIe function or a physical PCIe function) is no longer available, or has been deactivated. An event corresponding to the hot plugging of a component or the hot unplugging of a component is referred to as a "hot plug/unplug event" herein. The component may be a physical component or a virtual component.

In accordance with example implementations, the BMC 123 intercepts a hot plug/unplug event and coordinates with the OS-bare metal runtime supervisory service 150 to handle the event. More specifically, the BMC 123, in conjunction with BIOS 165 and operating system 163 components of the OS-bare metal runtime supervisory service 156, may handle the hot plug/unplug event for the compute appliance 110-1.

For example, in accordance some implementations, when a component (e.g., a USB drive) is hot plugged into a connector (e.g., a USB connector) of the compute appliance 110-1, the BMC 123 detects the insertion of the component into the connector and alerts the BIOS 165. The BIOS 165 enumerates the component (e.g., allocates memory space for the component) and informs the operating system 163 about the presence of the component. The operating system 163 may thereafter manage the component. The hot plug event may or may not comply with the reference compute state 138. In this manner, the reference compute state 138 may specify one or multiple conditions. For example, the reference compute state 138 may specify that a specific hot plug connector is to receive components having specific identifications, model numbers, serial numbers, performance characteristics, comparable characteristics to other installed components, and so forth. As another example, the reference compute state 138 may specific that a particular hot plug connector is not to receive hot plugged components.

The runtime supervisory service 150 (through its operating system 163 component) may detect when a particular component is hot unplugged. For example, a component may be unexpectedly removed (i.e., a "surprise removal") from its connector. For this scenario, the operating system 163 is the first to detect the removal, as the operating system 163 may be using the component. Depending on the configuration of the compute appliance 110-1, the compute appliance 110-1 may or may not accommodate the hot unplug event. For example, the compute appliance 110-1 may be configured to failover from one DIMM (e.g., DIMM that has failed and is hot unplugged) to a redundant DIMM. Conversely, hot unplugging a component (e.g., a DIMM) may cause a crash of the operating system 163 or application that uses the DIMM. The surprise removal may or may not comply with the reference compute state 138.

A hot unplug event may be or may not be detected by the operating system 163. For example, the compute appliance 110-1 may be configured with a resilient subsystem (e.g., a Redundant Array of Inexpensive Disks (RAID)) that includes redundant physical components (e.g., storage drives) that are behind logical components (e.g., logical units (LUNs)), such that if a given physical component fails, the subsystem may failover to another physical component in a transparent manner to the operating system 163. For this scenario, the BMC 123 may be notified about the hot unplug event. Moreover, the hot unplug event may or may not comply with the reference compute state 138.

Components may be hot plugged and hot unplugged from the compute appliance 110-1 for a variety of reasons. For example, a memory module (e.g., a DIMM) or a storage device (e.g., an NVMe drive) may fail or may be upgraded, the memory module or storage device may be downgraded in capacity, and so forth. The reference compute state 138, in accordance with example implementations, contains data identifying information relevant to hot plug/unplug events in the compute appliance 110-1, in accordance with example implementations. For example, the reference compute state 138 may designate specific connectors (e.g., DIMM connectors) in which hot plugging and hot unplugging are permitted, prohibit hot plugging or hot unplugging from specific connectors, and so forth. As a more specific example, certain connector slots may, for example, be associated with redundancy capabilities of the compute appliance 110-1. As a more specific example, in accordance with example implementations, the reference compute state 138 may allow hot plugging or hot unplugging to occur from a designated connector and further specify a manufacturer, a specific serial number (and thus, specifically identify the permitted component(s)), permitted capacities of components, and so forth.

Figure 7:
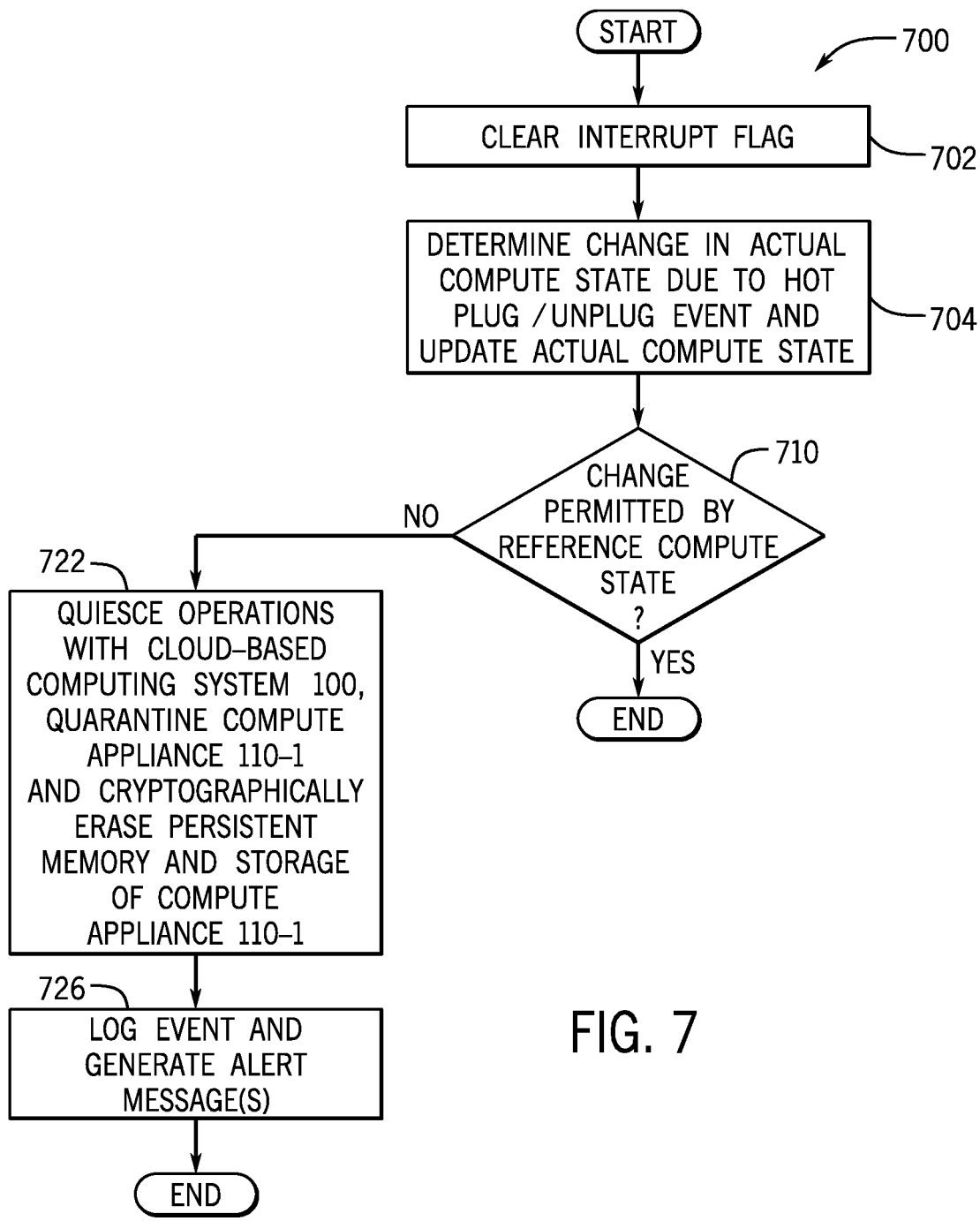
FIG. 7 is a flow diagram of an interrupt service routine to respond to a hot plug/unplug event occurring in the compute appliance according to an example implementation.

FIG. 7 depicts a process 700 performed in connection with an interrupt service routine for servicing an interrupt due to a hot plug/unplug event, in accordance with example implementations. In accordance with example implementations, the process 700 may be performed at least in part by a runtime supervisory service 150, and the process 700 may involve the BMC 123. Referring to FIG. 7 in conjunction with FIG. 1, in accordance with some implementations, the process 700 includes clearing (block 702) the corresponding interrupt flag and determining (block 704), a change in the actual compute state due to the hot plug/unplug event. Moreover, pursuant to block 704, the process 700 may include updating the actual compute state as a result of the hot plug/unplug event. Pursuant to decision block 710, a determination is made whether the change in the actual compute state is permitted by the reference compute state. In other words, in accordance with example implementations, decision block 710 may include determining whether the compute appliance 110-1 still complies with the reference compute state. If so, then the interrupt routine service process 700 terminates. Otherwise, pursuant to block 722, the runtime supervisory service 150 quiesces operations with the cloud-based computing system 100 and quarantines the compute appliance 110-1. Moreover, in accordance with example implementations, the runtime supervisory service 156 may, pursuant to block 726, log the event and generate one or multiple appropriate alert messages.

Figure 8:
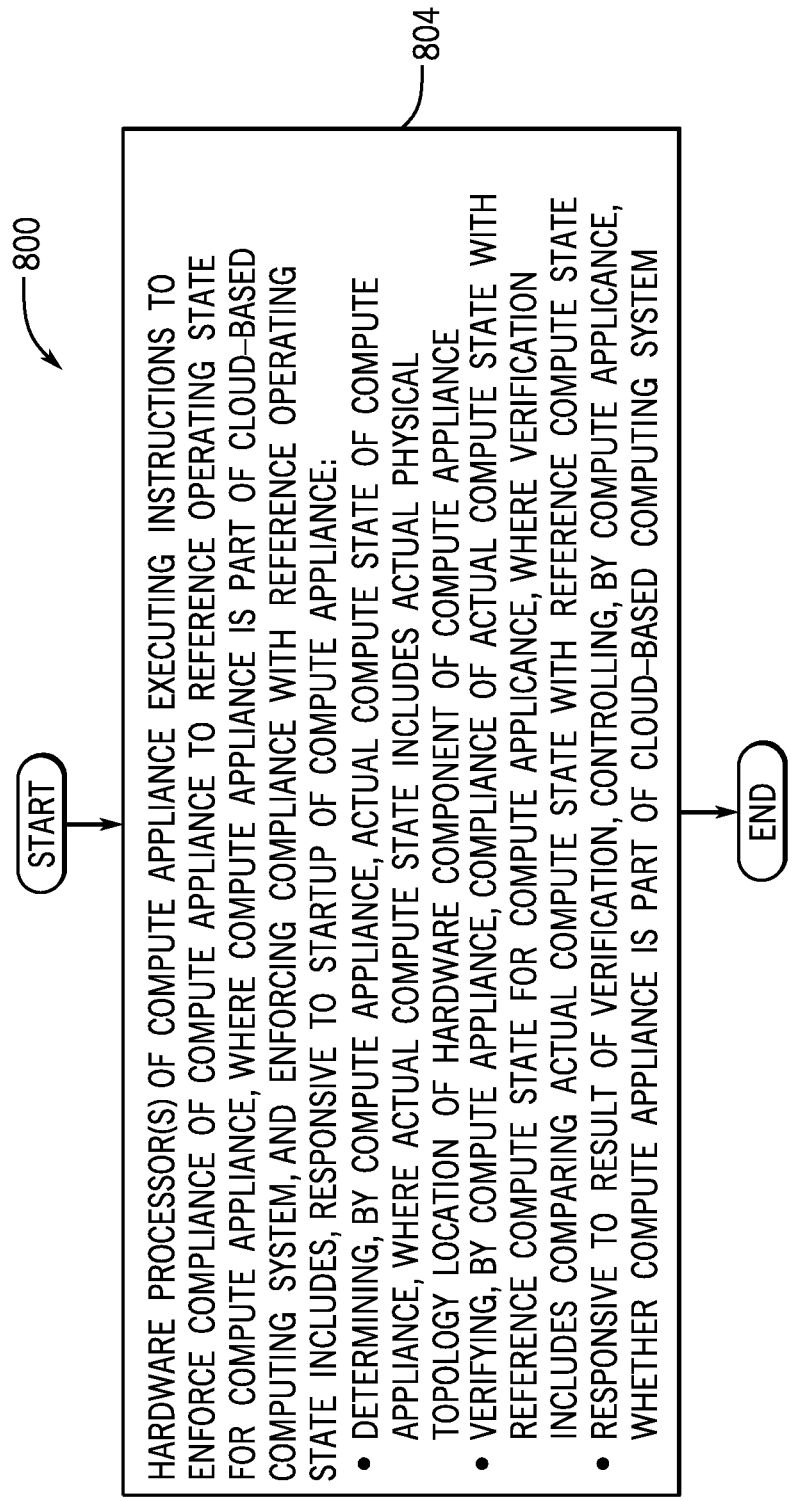
FIG. 8 is a flow diagram depicting a process to enforce compliance of a compute appliance with a reference operating state according to an example implementation.

Referring to FIG. 8, in accordance with example implementations, a process 800 includes, pursuant to block 804, at least one hardware processor of a compute appliance executing instructions to enforce compliance of the compute appliance to a reference operating state for the compute appliance. The compute appliance is part of a cloud-based computing system. Enforcing compliance with the reference operating state includes, responsive to a startup of the compute appliance, determining, by the compute appliance, an actual compute state of the compute appliance. The actual compute state includes an actual physical topology placement of a hardware component of the compute appliance, and the determination includes comparing the actual compute state to the reference compute state. Enforcing compliance with the reference operating state includes, responsive to a result of the verification, controlling, by the compute appliance, whether the compute appliance is part of the cloud-based computing system.

Figure 9:
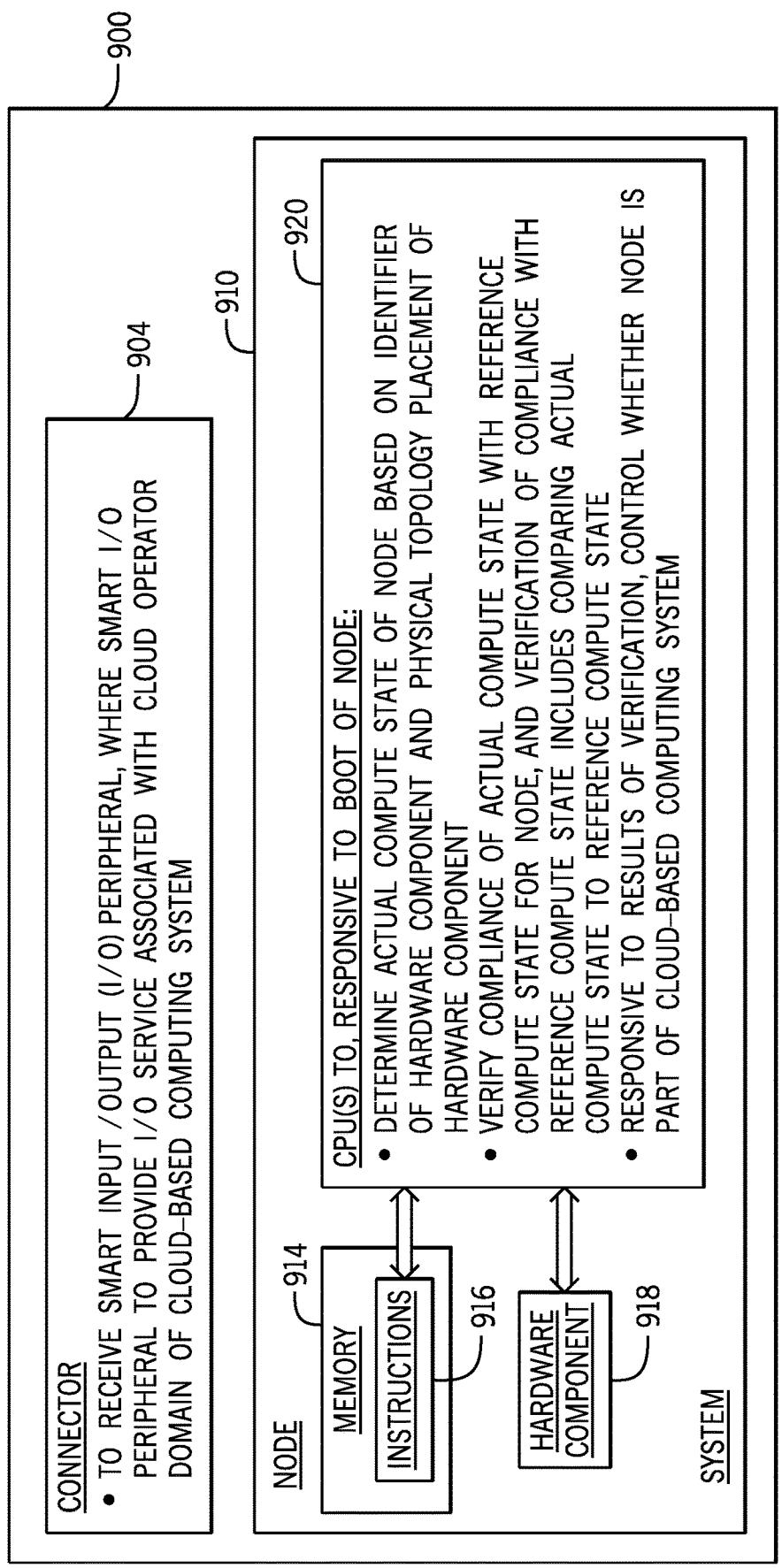
FIG. 9 is a block diagram of a system to enforce compliance of a node with a reference operating state according to an example implementation.

Referring to FIG. 9, in accordance with example implementations, a system 900 includes a connector 904 and a node 910. The connector 904 receives a smart input/output (I/O) peripheral. The smart I/O peripheral is to provide an I/O service that is associated with a cloud operator domain of a cloud-based computing system. The node 910 includes at least one central processing unit (CPU 920), a hardware component 918 and a memory 914. The CPU(s) 920 to execute instructions 916 that are associated with a tenant runtime environment and associated with a cloud-tenant domain. The CPU(s) 920 to execute instructions 916 to, responsive to a boot of the node, determine an actual compute state of the node based on an identifier of the hardware component 918 and a physical topology placement of the hardware component 918. The CPU(s) 920 to execute the instructions 916 to verify compliance of the actual compute state with a reference compute state for the node 910. The verification of compliance with the reference compute state includes comparing the actual compute state to the reference compute state. The CPU(s) 920 to execute the instructions 916 to, responsive to the verification result, control whether the node 910 is part of the cloud-based computing system.

Figure 10:
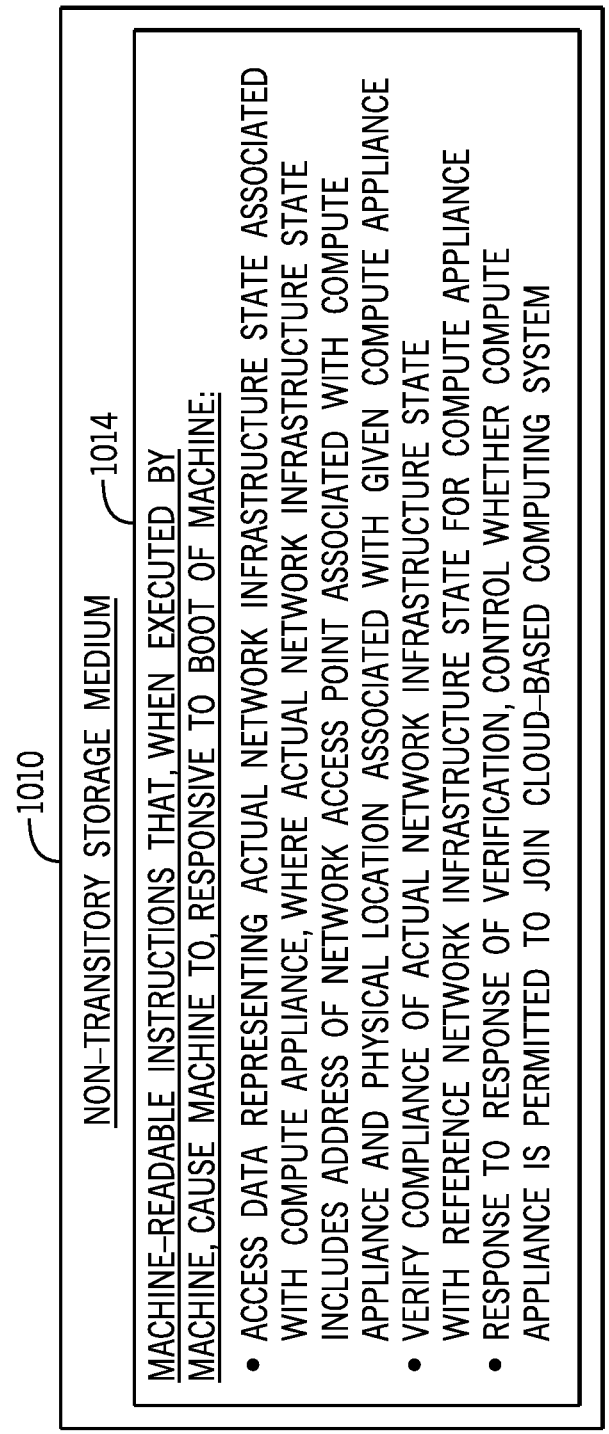
FIG. 10 is an illustration of a machine-readable non-transitory storage medium that stores instructions that, when executed by a machine, cause the machine to enforce compliance of a network infrastructure with a reference network infrastructure state according to an example implementation.

Referring to FIG. 10, in accordance with example implementations, a non-transitory storage medium 1010 stores machine-readable instructions 1014 that, when executed by a machine, cause the machine to access data representing an actual network infrastructure state that is associated with a compute appliance. The actual network infrastructure state includes an address of a network access point that is associated with the compute appliance and a physical location that is associated with the compute appliance. The instructions 1014, when executed by the machine, further cause the machine to verify compliance of the actual network infrastructure state with a reference network infrastructure state for the compute appliance. The instructions 1014, when executed by the machine, further cause the machine to, responsive to the verification, control whether the compute appliance is permitted to join a cloud-based computing system.

In accordance with example implementations, the process further includes controlling whether the compute appliance sets up a cloud tenant runtime environment responsive to the result. A particular advantage is that a compute appliance may, through actions taken onboard the compute appliance, protect a cloud-computing system from security attacks that may otherwise originate with the compute appliance.

In accordance with example implementations, controlling whether the compute appliance is part of the cloud-based computing system includes allowing the compute appliance to be part of the cloud-based computing system. The process further includes, responsive to a hot plug event that is associated with the compute appliance while the compute appliance is part of the cloud-based computing system, determining whether the hot plug event is allowed. The process further includes controlling whether the compute appliance remains part of the cloud-based computing system responsive to the determination of whether the hot plug event is allowed. A particular advantage is that a compute appliance may, through actions taken onboard the compute appliance, protect a cloud-computing system from security attacks that may otherwise originate with the compute appliance.

In accordance with example implementations, determining whether the hot plug event is allowed for the compute appliance includes identifying a hot plug connector associated with the hot plug event and determining whether the hot plug event is allowed based on the identification of the hot plug connector and an operating state enforcement policy. A particular advantage is that a compute appliance may, through actions taken onboard the compute appliance, protect a cloud-computing system from security attacks that may otherwise originate with the compute appliance.

In accordance with example implementations, determining the actual compute state includes determining a component inventory of the compute appliance. Determining the component inventory includes determining a first identifier for the hardware component. Determining the actual compute state further includes determining a complex identifier for the hardware component based on the physical topology location and the first identifier. Communicating the data that represents the actual compute state includes communicating data representing the complex identifier to the verifier. A particular advantage is that a compute appliance may, through actions taken onboard the compute appliance, protect a cloud-computing system from security attacks that may otherwise originate with the compute appliance.

In accordance with example implementations, the first identifier includes a cryptographic identifier. A particular advantage is that a compute appliance may, through actions taken onboard the compute appliance, protect a cloud-computing system from security attacks that may otherwise originate with the compute appliance.

In accordance with example implementations, the compute appliance includes a plurality of connectors, which are capable of receiving the hardware component. The connectors are arranged according to an order such that each connector has an associated index that represents a place of the connector in the order, and the physical topology location identifies the associated index of a connector in which the hardware component is installed. A particular advantage is that a compute appliance may, through actions taken onboard the compute appliance, protect a cloud-computing system from security attacks that may otherwise originate with the compute appliance.

In accordance with example implementations, the physical topology location includes at least one of the following: a memory cage number, a memory slot number, a drive cage number, a drive bay number, a wire harness number, a bus connector number, a bus connector cage number, a port number, or a central processing unit (CPU) socket number. A particular advantage is that a compute appliance may, through actions taken onboard the compute appliance, protect a cloud-computing system from security attacks that may otherwise originate with the compute appliance.

In accordance with example implementations, the process includes, responsive to the result, quarantining the compute appliance from the cloud-based computing system. A particular advantage is that a compute appliance may, through actions taken onboard the compute appliance, protect a cloud-computing system from security attacks that may otherwise originate with the compute appliance.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    at least one hardware processor of a compute appliance executing instructions to enforce compliance of the compute appliance to a reference operating state for the compute appliance, wherein the compute appliance is part of a cloud-based computing system, and enforcing compliance with the reference operating state comprises, responsive to a startup of the compute appliance:
        determining, by the compute appliance, an actual compute state of the compute appliance, wherein the actual compute state comprises an actual physical topology placement of a hardware component of the compute appliance, determining the actual compute state comprises determining the physical topology placement of the hardware component, the compute appliance comprises a plurality of physical locations in which the hardware component may be installed, and determining the physical topology placement of the hardware component comprises identifying a specific physical location of the plurality of physical locations;
        verifying compliance of the actual compute state with a reference compute state for the compute appliance, wherein the verification comprises comparing the actual compute state with the reference compute state, and comparing the actual compute state with the reference compute state comprises comparing the specific physical location to a physical location of the reference compute state;
        responsive to a result of the verification, controlling, by the compute appliance, whether the compute appliance is part of the cloud-based computing system; and
    responsive to the result of the verification, controlling, by the compute appliance, whether the compute appliance sets up a cloud tenant runtime environment.

2. The method of claim 1, further comprising:
    responsive to the result of the verification, controlling, by the compute appliance, whether the compute appliance provides a cloud tenant runtime environment.

3. The method of claim 1, wherein controlling whether the compute appliance is part of the cloud-based computing system comprises allowing the compute appliance to be part of the cloud-based computing system, the method further comprising:
    responsive to a hot plug event or hot unplug event associated with the compute appliance while the compute appliance is part of the cloud-based computing system, determining whether the hot plug event or hot unplug event complies with the reference compute state; and
    controlling whether the compute appliance remains part of the cloud-based computing system, responsive to the determination of whether the hot plug event or hot unplug event complies with the reference compute state.

4. The method of claim 3, wherein determining whether the hot plug event or the hot unplug event complies with the reference compute state comprises:

determining information describing the hot plug event or hot unplug event, wherein the information comprises at least one of identification of a connector or identification of a component associated with the hot plug event or hot unplug event; and determining whether the hot plug event or the hot unplug event complies with the reference compute state based on the information.

5. The method of claim 3, further comprising:

responsive to the determination of whether the hot plug event or hot unplug event complies with the reference state, quiescing an operation of the compute appliance.

6. The method of claim 1, wherein the compute appliance comprises a plurality of connectors capable of receiving the hardware component, the plurality of connectors being arranged according to an order such that each connector of the plurality of connectors has an associated index representing a place of the connector in the order, and the physical topology location identifies the associated index of a connector of the plurality of connectors in which the hardware component is installed.

7. The method of claim 1, wherein the physical topology location comprises at least one of the following: a memory cage number, a memory slot number, a drive cage number, a drive bay number, a wire harness number, a bus connector number, a bus connector cage number, a port number, or a central processing unit (CPU) socket number.

8. The method of claim 1, wherein determining the actual compute state comprises at least one of an identification of the hardware component or a category associated with the hardware component.

9. The method of claim 1, further comprising:

responsive to the result of the verifying, quarantining the compute appliance from the cloud-based computing system.

10. A method comprising:

at least one hardware processor of a compute appliance executing instructions to enforce compliance of the compute appliance to a reference operating state for the compute appliance, wherein the compute appliance is part of a cloud-based computing system, and enforcing compliance with the reference operating state comprises, responsive to a startup of the compute appliance:

determining, by the compute appliance, an actual compute state of the compute appliance, wherein the actual compute state comprises an actual physical topology placement of a hardware component of the compute appliance, determining the actual compute state comprises determining the physical topology placement of the hardware component, the compute appliance comprises a plurality of physical locations in which the hardware component may be installed, and determining the physical topology placement of the hardware component comprises identifying a specific physical location of the plurality of physical locations;

verifying compliance of the actual compute state with a reference compute state for the compute appliance, wherein the verification comprises comparing the actual compute state with the reference compute state, and comparing the actual compute state with the reference compute state comprises comparing the specific physical location to a physical location of the reference compute state; and responsive to a result of the verification, controlling, by the compute appliance, whether the compute appliance is part of the cloud-based computing system, wherein determining the actual compute state comprises:

determining a component inventory of the compute appliance, wherein determining the component inventory comprises determining a first identifier for the hardware component; and determining a complex identifier for the hardware component based on the physical topology location and the first identifier.

11. The method of claim 10, wherein the first identifier comprises a cryptographic identifier.

12. A system comprising:

a connector to receive a smart input/output (I/O) peripheral, wherein the smart I/O peripheral to provide an I/O service associated with a cloud operator domain of a cloud-based computing system; and a node comprising at least one central processing unit (CPU), a hardware component, and a memory, wherein the at least one CPU to execute instructions associated with an application operating environment and associated with a cloud tenant domain, and the at least one CPU to execute instructions to, responsive to a boot of the node:

determine an actual compute state of the node based on a physical topology placement of the hardware component and an identifier of the hardware component other than the physical topology placement;

verify compliance of the actual compute state with a reference compute state for the node, wherein the verification comprises comparing the actual compute state to the reference compute state; and responsive to the result of the verification, control whether the node is part of the cloud-based computing system.

13. The system of claim 12, wherein the physical topology location comprises a slot number or a cage number associated with the hardware component.

14. The system of claim 12, wherein the at least one CPU to execute the instructions to, responsive to the result of the verification, determine to quarantine the node from the cloud-based computing system.

15. The system of claim 12, wherein the compute appliance comprises a plurality of physical locations in which the hardware component may be installed, determining the physical topology placement of the hardware component comprises identifying a specific physical location of the plurality of physical locations, and verifying compliance of the actual network infrastructure state with the reference network infrastructure state further comprises comparing the specific physical location to a physical location of the reference network infrastructure state.

16. A non-transitory storage medium to store machine-readable instructions that, when executed by a machine, cause the machine to:

access data representing an actual network infrastructure state that is associated with a compute appliance, wherein the actual network infrastructure state includes a first address of a network access point that is associated with the compute appliance and a first physical location that is associated with the compute appliance;

verify compliance of the actual network infrastructure state with a reference network infrastructure state for the compute appliance, wherein the verification comprises verifying whether the first address is the same as an address specified by the reference network infrastructure state and verifying whether the first physical location is the same as a physical location specified by the reference network infrastructure state;

responsive to the verification, control whether the compute appliance is permitted to join a cloud-based computing system; and determine a performance criteria of a software defined network (SDN) connection associated with the compute appliance, wherein verifying the compliance comprises comparing the performance criteria to a reference criteria of the reference network infrastructure state.

17. The storage medium of claim 16, wherein the instructions, when executed by the machine, further cause the machine to:

determine a signature of a software defined compute (SDC) image of the compute appliance, wherein verifying the compliance comprises comparing the signature to a reference signature of the reference network infrastructure state.

18. The storage medium of claim 16, wherein the instructions, when executed by the machine, further cause the machine to:

determine a compute appliance scaling criteria of the reference network infrastructure state, wherein verifying the compliance comprises evaluating scaling of the cloud-based computing system associated with the compute appliance based on the compute appliance scaling criteria.

19. A non-transitory storage medium to store machine-readable instructions that, when executed by a machine, cause the machine to:

access data representing an actual network infrastructure state that is associated with a compute appliance, wherein the actual network infrastructure state includes a first address of a network access point that is associated with the compute appliance and a first physical location that is associated with the compute appliance;

verify compliance of the actual network infrastructure state with a reference network infrastructure state for the compute appliance, wherein the verification comprises verifying whether the first address is the same as an address specified by the reference network infrastructure state and verifying whether the first physical location is the same as a physical location specified by the reference network infrastructure state;

responsive to the verification, control whether the compute appliance is permitted to join a cloud-based computing system; and determine a geographical location associated with a software defined storage (SDS) connection associated with the compute appliance, wherein verifying the compliance comprises comparing the geographical location to a geographical reference criterion of the reference network infrastructure state.

* * * * *